United States Patent [19]

Blau et al.

[11] Patent Number: 4,468,748

[45] Date of Patent: Aug. 28, 1984

[54] FLOATING POINT COMPUTATION UNIT HAVING MEANS FOR ROUNDING THE FLOATING POINT COMPUTATION RESULT

[75] Inventors: Jonathan S. Blau, Natick; Robert W. Beauchamp, Milford, both of Mass.

[73] Assignee: Data General Corporation, Westboro, Mass.

[21] Appl. No.: 272,541

[22] Filed: Jun. 11, 1981

[51] Int. Cl.³ .............................................. G06F 7/48
[52] U.S. Cl. .................................... 364/748; 364/745; 364/749
[58] Field of Search ............... 364/748, 749, 745, 736, 364/784–787, 778–783

[56] References Cited

U.S. PATENT DOCUMENTS

| | | | |
|---|---|---|---|
| 4,161,784 | 7/1979 | Cushing et al. | 364/749 X |
| 4,208,722 | 6/1980 | Rasala et al. | 364/760 |
| 4,224,676 | 9/1980 | Appelt | 364/900 |
| 4,229,801 | 10/1980 | Whepple | 364/748 |
| 4,295,203 | 10/1981 | Joyce | 364/748 |

OTHER PUBLICATIONS

*A Microprogrammed 16-Bit Computer*, Advanced Micro Devices, Inc., pp. 16–17, 1976.

*Primary Examiner*—David H. Malzahn
*Assistant Examiner*—Ronni S. Malamud
*Attorney, Agent, or Firm*—Robert F. O'Connell

[57] ABSTRACT

A floating point computation unit for use in a data processing system in which the mantissa processing means provides an overall computation result a portion of which represents the desired mantissa result. A carry-in bit is added to the least significant bit of the overall result and is propagated through the mantissa processing means so that it can be added to the least significant bit of the desired mantissa result to provide a rounding of such desired result.

11 Claims, 38 Drawing Figures

CSM & EXT - Control Store Mode & Extension Fields

The FPU is cycled twice for each micro-instruction. The CSM
& EXT fields define the sources of control during the two
halve cycles.

The Fxxx & Qxxx & BOUT modes use both cycles for normal A <op>
B -> B. The remaining modes perform 2 FPU operations. Most
tests, and TLCH (nibble shift input) look at only first half
data during these modes. Sxxx modes perform an operation first
half, but use the D bus 2nd half. NORM and PRESC are used to
normalize and prescale floating point operands. MPY implements
a double cycle two bit BOOTH multiply algorithm, while DIV
implements a double cycle non-restoring divide Summary of CSM characteristics:

| CSM Mnem | Val | EXT Mnem | Val | Half-cycle 1 ALUS | ALUOP | FPUD | Half-cycle 2 ALUS | ALUOP | FPUD |
|---|---|---|---|---|---|---|---|---|---|
| SMATH | 0 | \ | | | | | | | |
| SFIXP | 1 | DBL | 0 | uI16 | uI16 | # | DZ16 | OR16 | uI |
| SGEN | 2 | SGL | 2 | uI6/DZ10 | uI6/AND10 | # | DZ16 | OR6/AND10 | uI |
| SATU | 3 | / | | | | | | | |
| FMATH | 4 | \ | | | | | | | |
| FFIXP | 5 | DBL | 0 | uI16 | uI16 | # | uI16 | uI16 | uI |
| FGEN | 6 | SGL | 2 | uI6/DZ10 | uI6/AND10 | # | uI6/DZ10 | uI6/AND10 | uI |
| FATU | 7 | / | | | | | | | |
| BOUT | A | \ | | | | | | | |
| QDEC | C | DBL | 0 | uI16 | uI16 | # | UI16 | uI16 | uI |
| QINC | D | SGL | 2 | uI6/DZ10 | uI6/AND10 | # | uI6/DZ10 | uI6/AND10 | uI |
| QADD | E | / | | | | | | | |
| MPY | 8 | NOP | 0 | @16 | @16 | # | @16 | @16 | uI |
| MPY | 8 | FST | 1 | @16 | @16 | # | @16 | @16 | uI |
| DIV | 9 | NOP | 0 | uI16 | @16 | uI | uI16 | @16 | uI |
| NORM | B | DBL | 0 | uI16 | uI16 | # | DZ16 | OR16 | uI |
| NORM | B | ADS | 1 | uI6/ZQ10 | uI16 | # | DZ16 | OR16 | uI |
| NORM | B | SGL | 2 | uI6/DZ10 | uI6/AND10 | # | DZ16 | OR16 | uI |
| PRESC | F | WTR | 0 | @16 | uI16 | # | DZ16 | OR16 | uI |
| PRESC | F | NTR | 1 | @16 | uI16 | # | DZ16 | OR16 | uI |

In the above tables the following abbreviations are used:

uI16 - The u-order from the appropriate field of the
specified u-instruction controls all 16 slices.

<specified>16 - The <specified> u-order from the above table controls
all 16 slices.

\# - No clock takes place, but the FPUD u-order still
controls the AOUT mux.

@16 - The u-order will defer to a predecoded or "forced"
value for all 16 slices, as explained on the next page.

uI6/<specified>10 - The u-order from the appropriate field of the specified
u-instruction controls the most significant 6 slices.
The least significant 10 slices are forced to the
<specified> u-order from the above table.

*FIG. 3*

CSM - Control Store Mode Field

The ALU is cycled twice for each micro-instruction. The CSM field defines the sources of control during the two halve cycles.

The Fxxx modes use both cycles for normal A + B -> B operation. The remaining modes perform 2 ALU operations. Most tests, LA, and TLCH (nibble shift input) look at only first half data during these modes. Sxxx modes are useful for setting up tests or memory starts with the second half used for reading memory, CPDB, or the nibble shifter. ROUT is similar but allows memory write the second half. The Qxxx modes allow two registers to be loaded in one cycle. The Q register is generally used to contain an address which will be incremented or decremented before each memory start. MPY and DIV implement double cycles of the multiply and divide algorithms.

Summary of CSM Characteristics:

| Mnem | Value | Half-cycle 1 | | | Half-cycle 2 | | | DIST Type | CRYIN | RAND Type |
|------|-------|------|-------|------|------|-------|------|------|-------|------|
|      |       | ALUS | ALUOP | ALUD | ALUS | ALUOP | ALUD |      |       |      |
| SMATH | 0 | uI | uI | # | DZ | OR | uI | Math | Type0 | Math |
| SFIXP | 1 | uI | uI | # | DZ | OR | uI | Gen | Type1 | Fixp |
| SGEN | 2 | uI | uI | # | DZ | OR | uI | Gen | Type0 | Gen |
| SATU | 3 | uI | uI | # | DZ | OR | uI | Gen | Type0 | Atu |
| FMATH | 4 | uI | uI | # | uI | uI | uI | Math | Type0 | Math |
| FFIXP | 5 | uI | uI | # | uI | uI | uI | Gen | Type1 | Fixp |
| FGEN | 6 | uI | uI | # | uI | uI | uI | Gen | Type0 | Gen |
| FATU | 7 | uI | uI | # | uI | uI | uI | Gen | Type0 | Atu |
| MPY | 8 | @ | @ | # | @ | @ | uI | Math | Type2 | Math |
| DIV | 9 | uI | @ | uI | uI | @ | uI | Math | Type3 | Math |
| BOUT | A | uI | uI | # | ZB | OR | uI | Gen | Type0 | Gen |
| NORM | B | uI | uI | # | DZ | OR | uI | Math | Type0 | Math |
| QDEC | C | ZQ | SUB | QREG | uI | uI | uI | Gen | *Type0 | Gen |
| QINC | D | ZQ | ADD | QREG | uI | uI | uI | Gen | *Type0 | Gen |
| QADD | E | DQ | ADD | QREG | uI | uI | uI | Gen | *Type0 | Gen |
| PRESC | F | @ | OR | # | DZ | OR | uI | Math | Type0 | Math |

In the above table the following abbreviations are used:

uI - Represent the u-order from the appropriate field of the specified u-instruction.

- No clock takes place.

@ - The u-order will defer to a predecoded or "Forced" value, explained on the next page.

* - The CRYIN is forced to a zero the first half cycle in modes QDEC and QADD, and to a one during the first half of mode QINC.

FIG. 4

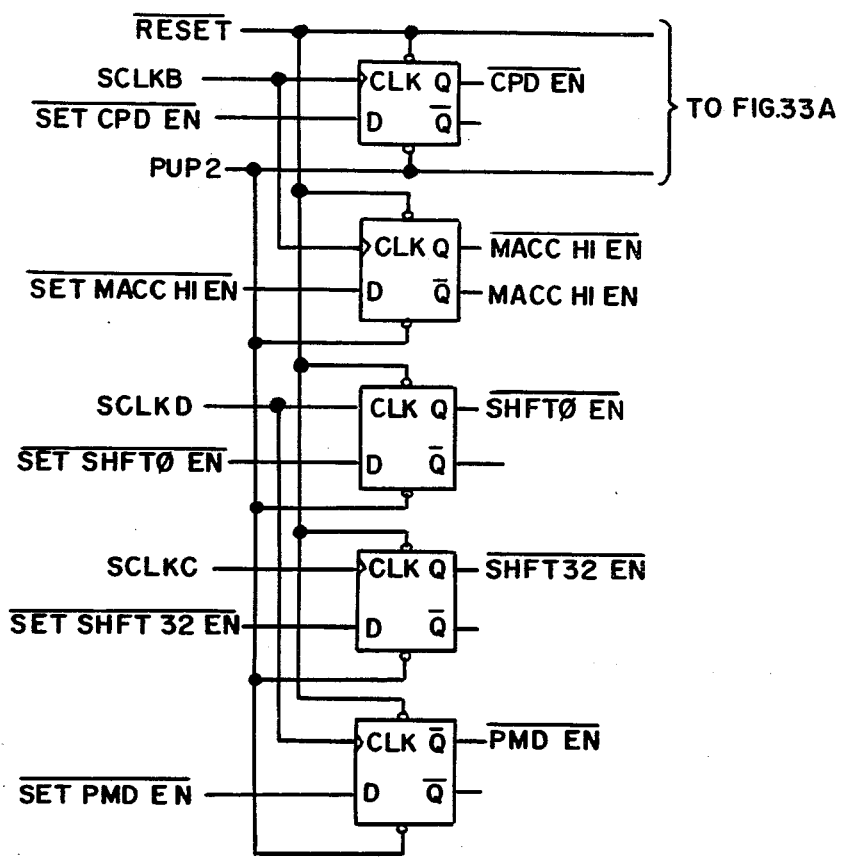
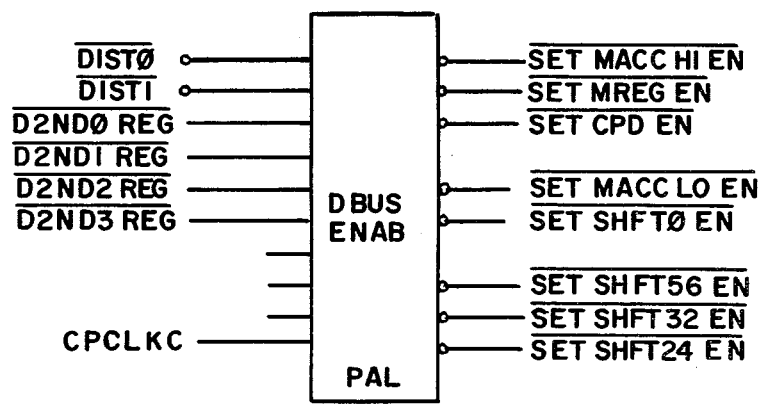
FIG.33

FLOATING POINT COMPUTATION UNIT HAVING MEANS FOR ROUNDING THE FLOATING POINT COMPUTATION RESULT

INTRODUCTION

This invention relates to arithmetic units for use in data processing systems and, more particularly, to a floating point computation unit for use in providing a single precision or double precision accuracy and to an improved technique used therein for providing rounding of the calculated result in a floating point mantissa computation operation.

BACKGROUND OF THE INVENTION

Data processing systems utilize arithmetic calculation units for performing fixed or floating point calculations. One such system, for example, is utilized in a 32-bit processing system made and sold by Data General Corporation of Westboro, Mass. under the disignation ECLIPSE ® MV/8000. Such system utilizes an arithmetic logic unit which can perform both fixed point calculations and floating point calculations.

In performing floating point calculations, the arithmetic logic unit of such system can be operated to produce either "single precision" accuracy wherein the floating point mantissa result comprises 24 bits (the remaining 8 bits being designated as "guard bits" for use in rounding operations) or "double precision" accuracy in which the calculation is effectively a 64-bit operation wherein the floating point mantissa result comprises 56 bits (the remaining 8 bits being used for rounding in the same manner as in single precision operations). In the present ECLIPSE ® MV/8000 system double precision operations are performed by the arithmetic logic unit as two sequential 32-bit operations so that the overall time required for double precision is substantially greater than that required for single precision operation.

It is desirable to be able to perform the double precision operation in substantially less time compared to that presently required for the double precision operations in the current system without greatly increasing the overall complexity or cost of the system in this regard.

An appropriate technique for doing so which has been suggested by the art involves the performance of floating point operations by a floating point arithmetic computation unit which is separate from the arithmetic computation unit which performs fixed point operations. The floating point unit would be capable of performing its operation on 32-bit or 64-bit words to achieve both single and double precision operations. Thus, such a system would utilize both an arithmetic logic unit (ALU) and a floating point unit (FPU), each having its own control store for storing its own microinstructions (i.e., microcode) which are used in performing the separate types of arithmetic calculations involved. Accordingly, the ALU control store would provide microcode for performing 32-bit fixed point operations while the FPU control store would provide microcode for performing both 32-bit and 64-bit floating point operations. The time required to perform a complete double precision floating point operation would be reduced over that required to perform such double precision floating point operations using only a single arithmetic logic unit which can operate only on 32-bit words at a time. Such an approach, however, requires the provision of an additional different control store with entirely different microcode for controlling the operation of the FPU independently and separately from the control store and microcode operation of the ALU.

Alternatively, it has been suggested that a single control store be used, which store, however, is considerably enlarged in comparison with that previously required when using a single arithmetic logic unit so as to provide completely different and separate sets of control fields for controlling the operation of the ALU and for controlling the operation of the FPU. The use of such an enlarged control store is required in order to accommodate a sufficient number of control fields to assure that such units are independently and effectively separately controlled.

It would be desirable, however, to be able to provide the above desired operation without the need for two separate control stores or for such an enlarged control store.

SUMMARY OF THE INVENTION

In accordance with the invention fixed point operations, as well as single and double precision floating point operations, can be achieved utilizing an ALU board and a separate FPU board, both of which are controlled through the use of a single common control store having common control fields. In effect, then, control of both boards is achieved using substantially the same overall microcode, except for the microcode which relates to floating point operations. The general configuration of the FPU board is substantially similar to the general configuration of the ALU board and both boards share common microinstruction fields for the control of their operations, the FPU board requiring the use of only two additional fields for controlling destination operations and for controlling single and double precision floating point operations. Such additional 3-bit and 2-bit fields, respectfully, can be readily accommodated in the single previously used control store without enlargement thereof. The remaining microcode fields are common to both ALU and FPU boards, the FPU board utilizing such microcode when a floating point operation is required (the ALU board being effectively disabled) and the ALU board using such microcode when non-floating point operation is required (the FPU board being effectively disabled).

A double precision operation can be performed at a speed which is substantially greater than that required when using the conventional 32-bit single ALU board operation mentioned above. Further, since substantially the same microcode is used for both ALU and FPU operations, it is not necessary to rewrite, or to add to, the previously used microcode for non-floating point operations except for minimal control field additions needed to distinguish between ALU or FPU operations, such operations otherwise using the same control fields as used for the previous ALU operation. Because the ALU board and the FPU board share the same fields, except for the added destination and single/double precision fields needed for the FPU, the complexity and costs of the system are reduced over systems which require two complete separate control stores or two completely separate sets of control fields of a single control store.

Moreover, the system is readily adapted to implementing an improved technique for providing floating point arithmetic rounding operations in either single or double precision modes.

DESCRIPTION OF THE INVENTION

The invention can be described in more detail with the help of the accompanying drawings wherein:

FIG. 3 shows a chart defining the control store mode (CSM) and extension (EXT) fields as used in floating point microinstructions in accordance with the invention;

FIG. 4 shows a chart defining the comparable control store mode (CSM) fields of the previously used MV/8000 system and;

When using a floating point unit for providing either single or double precision operation and calculating the mantissa value, the 64-bit word which results comprises the following portions:

bits 0–55, with bits 56–63 operating as the "guard" bits thereof.

Figure 1:
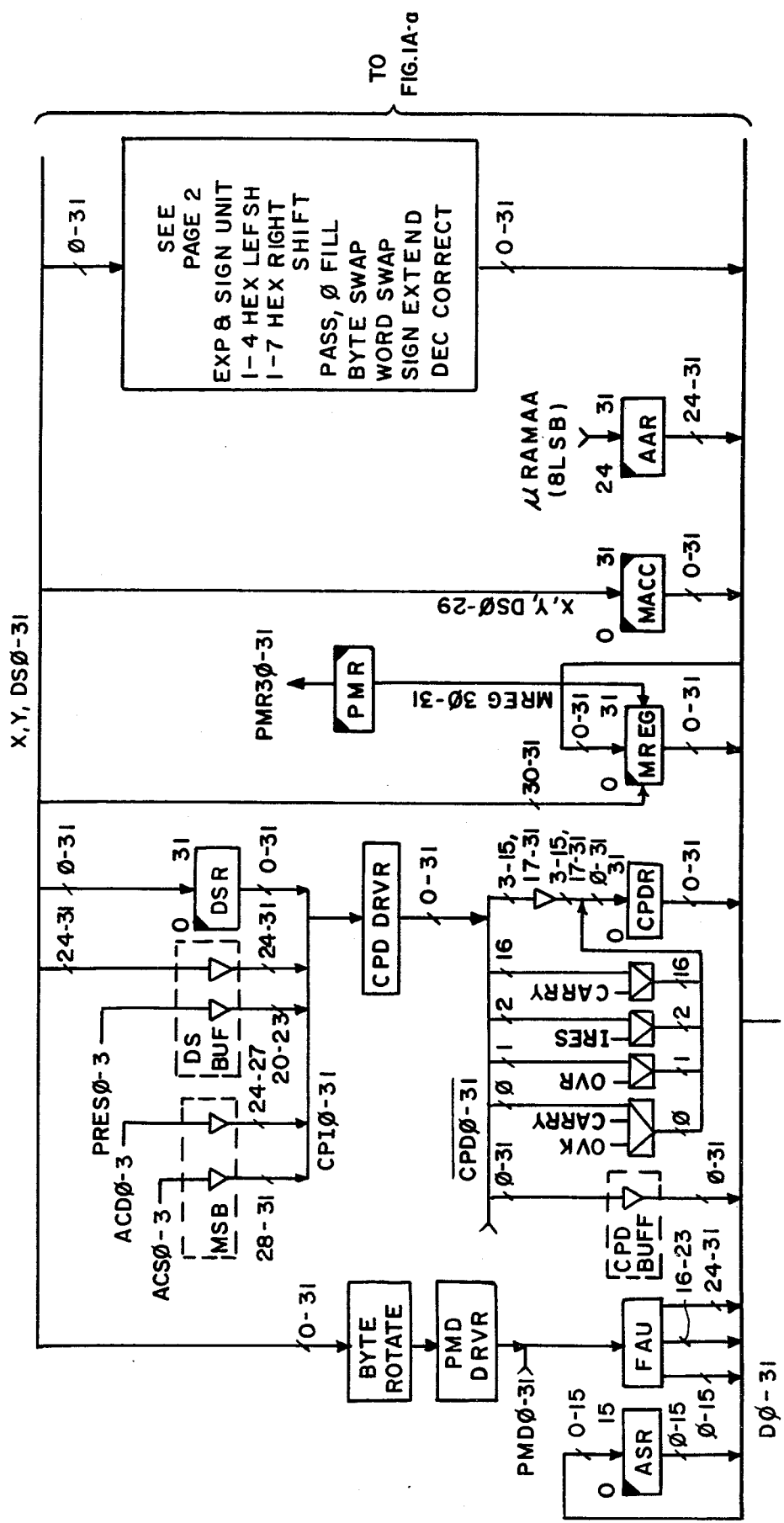
FIGS. 1 and 1A show a block diagram of an arithmetic logic unit as used in the prior ECLIPSE MV/8000 unit.
Figure 1:
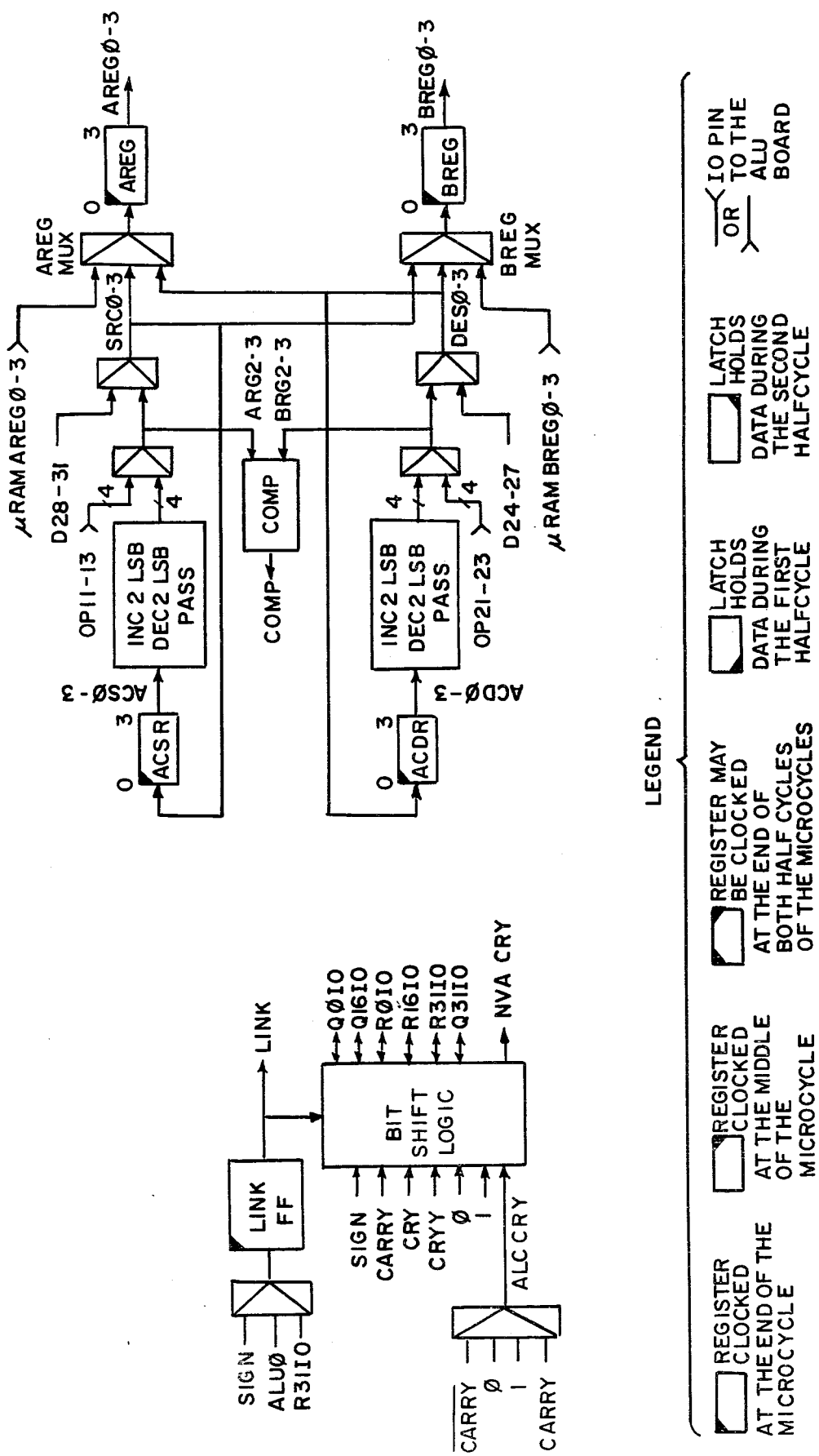
Figure 1A:
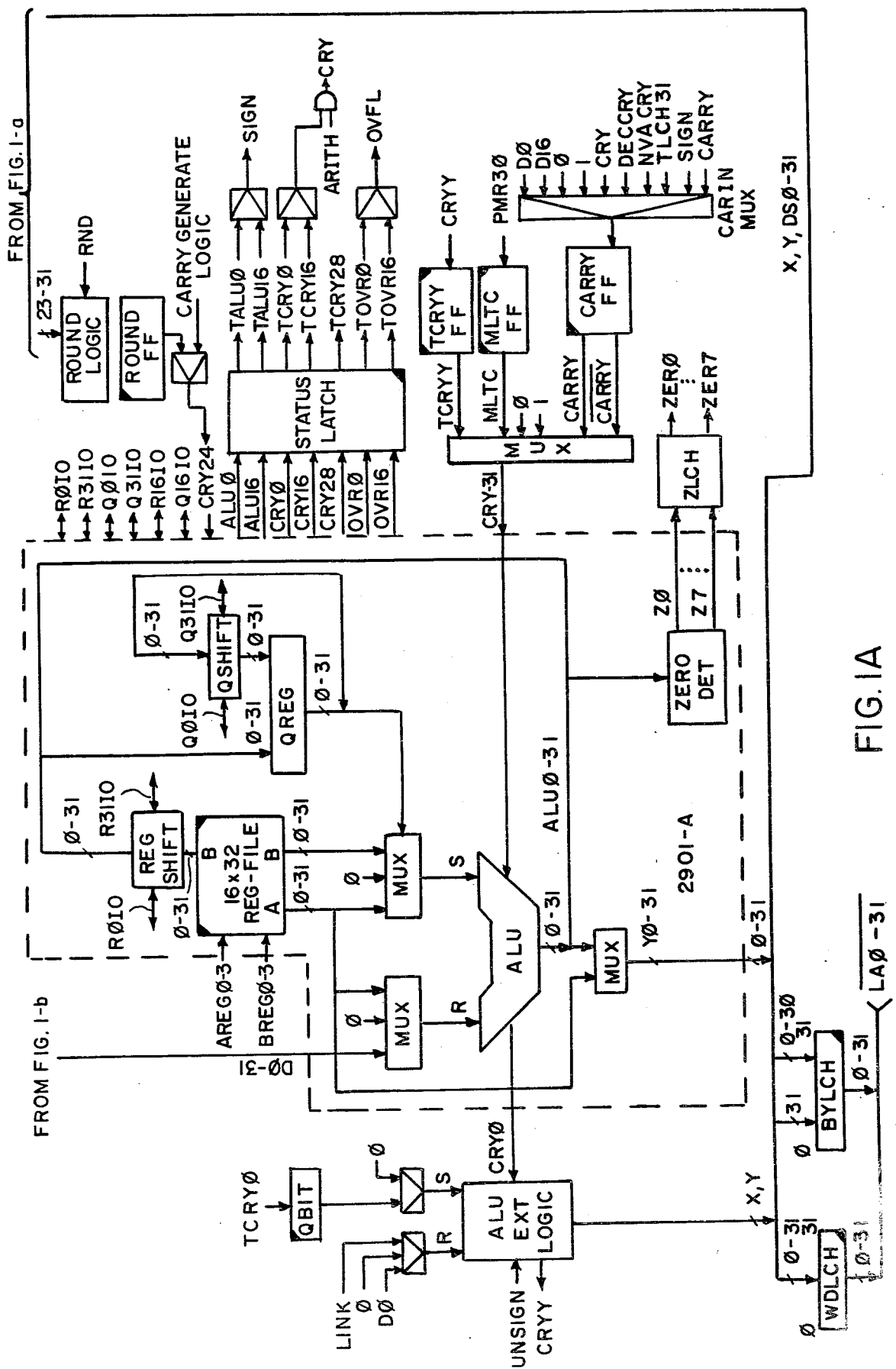

In performing both fixed and floating point arithmetic operations in the aforesaid ECLIPSE® MV/8000 system, a single arithmetic logic unit (ALU) as shown in broad block diagram form in FIGS. 1 and 1A is used. The operation thereof is known to the art with respect to such presently available MV/8000 system. In accordance with the invention, a separate floating point unit (FPU) is used for performing floating point calculations, such unit having the broad block diagram configuration shown in FIGS. 2 and 2A. As can be seen therein, the overall operational block diagram of the FPU is substantially similar to that of the previously utilized ALU.

Control of the operation of the ALU in the previous MV/8000 system is determined in accordance with specifically devised microcode, a typical 80-bit microinstruction format as used therein, for example, being described below:

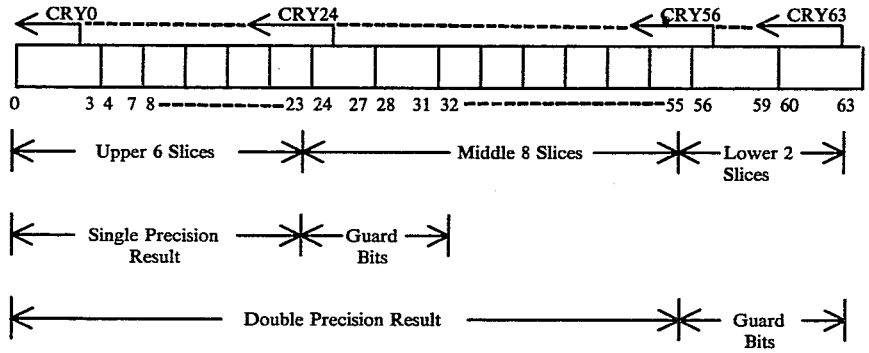

MV/8000 MICROINSTRUCTION FORMAT

In such format bits 74–78 were unused in the MV/8000 system and the microcode field designated as the CSM (control store mode) controlled operations of the ALU for both fixed and floating point modes. In accordance with the invention, control of both the separate ALU and the FPU boards is achieved through the use of essentially the same microcode control store and microinstruction format wherein the five previously unused bits 74–78 are used to provide two additional fields for controlling the operation of the floating point unit destination registers (the FPUD field bits 74–76) and for controlling operation for either single or double precision results (the EXT field bits 77 and 78), as described in more detail below.

Thus, in the invention the microinstruction fields which control the operation of the floating point unit

DATA WORD FOR FLOATING POINT

Mantissa Operation

During a single precision operation only 32 bits (bits 0–31) of the 64-bit words are used (bits 32–63 are "zero"). The floating point mantissa result comprises bits 0–23 while bits 24–31 are designated as "guard" bits which are utilized in a rounding operation, as discussed in more detail below. When providing double precision operation the mantissa floating point result comprises are the control store mode (CSM) field bits 28–31, the 3-bit floating point unit destination (FPUD) field bits 74–76, and the 2-bit extension (EXT) field, bits 77 and 78. As in the previous ECLIPSE® MV/8000 unit, the operations for both the arithmetic logic unit and the floating point unit are cycled twice for each microinstruction (a first half-cycle and a second half-cycle) and the CSM, FPUD and EXT fields define the sources of control during each of the half-cycles.

A summary of the control store mode field and the extension field operations is shown in FIG. 3 for the various operations which are performed. As in the MV/8000 the floating point operation is performed in 4-bit slices, the overall 64-bit data words utilized comprising sixteen 4-bit slices, the single precision floating point result comprising six 4-bit slices (the "upper" six slices) and the double precision 56-bit result comprising fourteen 4-bit slices (the "upper" six slices and the "middle" eight slices) and the guard bits for use in the double precision mode comprising two 4-bit slices (the "lower" two slices). In the first twelve mathematical operations performed, such operations can be either single or double precision operations as determined by the extension (EXT) field bits.

In the control store mode and extension fields described in FIG. 3, the FMATH, FFIXP, FGEN, FATU, BOUT, QDEC, QINC and QADD modes use both half-cycles 1 and 2 for their normal operations (e.g., A op B→B). The remaining modes perform two FPU operations. Thus, the SMATH, SFIXP, SGEN and SATU modes perform an operation during the first half-cycle but utilize the data bus (DBUS) during the second half-cycle. The NORM and PRESC modes are used to normalize and prescale the floating point operands, respectively, while the MPY mode implements a double cycle 2-bit Booth's multiply algorithm and the DIV mode implements a double cycle non-restoring divide operation, the latter operations both being conventionally well known to the art.

The first twelve mathematical modes can be used for either double or single precision accuracy and such operation is determined by the EXT field as shown in FIG. 3. Thus, for a double precision operation, where all sixteen 4-bit slices are utilized, the microorder from the appropriate field of the specified microinstruction (uI) or the DBUS use controls all sixteen slices. This is designated in FIG. 3 by the presence of uI16 or the designations DZ16 and OR16 in the appropriate ALU and FPU fields, i.e., the ALUS (ALU source), the ALUOP (ALU operation) field and the FPUD (FPU destination) field. The designation "#" during the first half cycle for the FPUD field merely indicates that no FPUD clocking takes place (i.e., there is no FPU destination operation for such mode during the first half-cycle) and the designation "@16" indicates that the microorder will defer to a pre-decoded or "forced" value.

For a single precision operation the lower ten 4-bit slices (bits 24–63) are zero since only bits 0–23 are used. In the particular operation of the floating point unit an "AND" operation in which one of the operands is zero at each bit slice provides for a propagation of an input carry (CRY) bit through each bit slice to the output carry bit so that the FPU "CRYIN" is propagated throughout the lower ten 4-bit slices for single precision operation. The basis for such operation of the FPU computation circuit in this regard is described in more detail below with respect to the description of rounding techniques discussed at a later point herein. While zeros are present in the lower ten 4-bit slices the microorder from the appropriate field of the specified microinstruction (uI) controls the upper six 4-bit slices. For example, in the first half-cycle for all of the four Fxxx modes shown in FIG. 3, single precision operation (EXT field 2) is designated by the legends "uI6/DZ10" (indicating the operands of the upper six slices are under microinstruction control and the operands of the lower ten slices are the DBUS and zero) for the ALUS field and "uI6/AND10" (indicating the operands of the upper six slices are under microinstruction control and each of the lower ten slices receive an AND operation) for the ALUOP field. The FPUD field is not used in the first half-cycle, while such field is under microinstruction control during the second half-cycle.

The Control Store Mode for controlling operation of the ALU utilizes substantially the same microcode, as shown by the CSM characteristics depicted in FIG. 4 (which is also the control store mode set up to control operation in the previously designed ECLIPSE® MV/8000 system). As can be seen therein, where there is no separately defined single or double precision operation for the ALU, effectively the same CSM operations are performed as for FPU operation and no EXT field is required. Thus, for ALU operation control field bits 74–78 of the above microinstruction are not utilized (no FPUD field and no EXT field controls are required). In each case, for both ALU and FPU operations, the ALUS and the ALUOP field values represent exactly the same operations as shown below.

| ALUS FIELD (R,S) | | ALUOP FIELD | | |
|---|---|---|---|---|
| AQ | 0 | ADD | 0 | (R + S) |
| AB | 1 | SUB | 1 | (S − R) |
| ZQ | 2 | RSB | 2 | (R − S) |
| ZB | 3 | OR | 3 | (R or S) |
| ZA | 4 | AND | 4 | (R * S) |
| DA | 5 | ANC | 5 | (R' * S) |
| DQ | 6 | XOR | 6 | (R xor S) |
| DZ | 7 | XNR | 7 | (R xor S)' |

For the ALU operations the ALUD field and for FPU operations the FPUD field are also shown below.

| Mnem | Value | Description |
|---|---|---|
| | | ALUD FIELD |
| NLD | 0 | No load; Y<0–31> = ALU<0–31> |
| QREG | 1 | Load QREG only; Y<0–31> = ALU<0–31> |
| BREG | 2 | Load BREG only; Y<0–31> = ALU<0–31> |
| AOUT | 3 | Load BREG only; Y<0–31> = AREG<0–31> |
| RSHB | 4 | Load BREG with ALU shifted right one bit; LINK register := ALU31; Y<0–31> = ALU<0–31> |
| RSQB | 5 | Load BREG with ALU shifted right one bit; Shift QREG right; Y<0–31> = ALU<0–31> LINK register := ALU31 |
| LSHB | 6 | Load BREG with ALU shifted left one bit; Y<0–31> = ALU<0–31> LINK gets ALU16, ALU0 for FLAG0 = 0,1 respectively. |
| LSQB | 7 | Load BREG with ALU shifted left one bit; Shift QREG left; Y<0–31> = ALU<0–31> LINK gets ALU16, ALU0 for FLAG0 = 0,1 respectively. |
| | | FPUD FIELD |
| NLD | 0 | No load; Y<0–63> = FPU<0–63> |
| QREG | 1 | Load QREG only; Y<0–63> = FPU<0–63> |
| BREG | 2 | Load BREG only; Y<0–63> = FPU<0–63> |

-continued

| Mnem | Value | Description |
|---|---|---|
| AOUT | 3 | Load BREG only; Y<0-63> = AREG<0-63> |
| RSHB | 4 | Load BREG with FPU shifted right one bit; BREG <0-63> := 0, FPU<0-62> LINK := 0 |
| RSQB | 5 | Load BREG, QREG with FPU, QREG shifted right one bit; BREG<0-63> :=0, FPU<0-62> QREG<0-63> :=FPU63, QREG<0-62> LINK := 0 |
| LSHB | 6 | Load BREG with FPU shifted left one bit; BREG<0-63> :=FPU<1-63>, QREG0 LINK := FPU0 |
| LSQB | 7 | Load BREG, QREG with FPU, QREG shifted left one bit; BREG<0-63> := FPU<1-63>, QREG0 QREG<0-63> := QREG<1-62>, CRYY LINK := FPU0 |

In each case (for the ALUD field and the FPUD field) a zero value is a no load operation. Thus, when the FPU board is being utilized for a floating point operation by the system, the ALUD field has a zero value so that no ALU calculations can be loaded into any destination register, while the FPUD field assumes a value which identifies an appropriate destination register into which a floating point answer can be loaded in accordance with the FPUD field above. However, if data is being transferred between the ALU and the FPU, the microcode can be written to allow loading of a destination register on each board, according to the algorithm appropriate for the instruction being implemented.

In the same manner, when the ALU board is being utilized for a fixed point operation by the system, the FPUD field has a zero value so that no FPU calculations can be loaded into any destination register, while the ALUD field assumes a value which identifies an appropriate register into which an ALU result can be loaded in accordance with the ALUD field above.

Accordingly, substantially the same microcode is used for non-floating point operations. Floating point microcode is rewritten to control the FPU maintaining identical algorithms so that results with ALU only or ALU and FPU are the same. This requires an additional 2-bit fields (the EXT field) in order to provide for suitable single or double precision floating point operation and an additional 3-bit field (the FPUD field) in order to identify FPU destination operations. Because the same microcode is used for each board, only a single microcontrol store is needed for storing the microinstructions required for controlling the operation of both boards. For double precision operation, the FPU board operates on a 64-bit word and, therefore, the overall double precision floating point calculation can be performed in less time than was required for the previous MV/8000 operation when the ALU board was used to provide both floating point single and double precision calculations but could only do so by operating on 32-bit words at one time. However, the results produced are identical.

In addition to providing a separate board for performing single and double precision floating point computations, as discussed above, the floating point unit also is designed so as to provide "rounding" of the single or double precision floating point mantissa results in a unique manner as described below. As is well known, a conventional floating point mantissa calculation for addition or subtraction can occur in four cycles, as set forth below.

1. A comparison of the floating point operands is made to determine which is larger.
2. The smaller operand is pre-scaled so as to align its radix point.
3. The floating point operation is performed and normalized so as to produce an unrounded result.
4. The unrounded result is rounded and the rounded result is normalized.

In a floating point mantissa operation a round bit can be appropriately added into the least significant bit of the floating point result (e.g., bit 23 of the single precision operation or bit 55 of a double precision operation). Techniques for performing such rounding operation are discussed in copending U.S. patent application Ser. No. 256,726, filed Apr. 23, 1981 by J. Rosen. As discussed therein the calculation is performed in 4-bit slices with the appropriate "carry" bits for each slice being effectively inserted into the next higher adjacent slice, as shown below, (CRY∅ is the carry bit for the overall result). In an actual circuit implementation, for example, carry look-ahead circuits can be used to supply the carry-in bits to each slice.

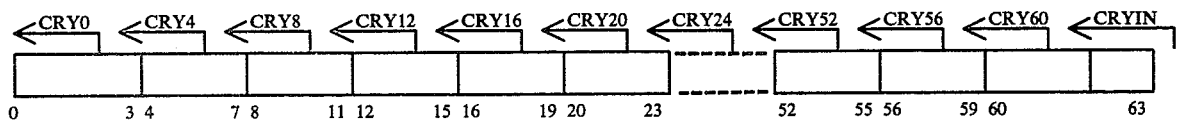

CARRY BIT OPERATIONS

The floating point computation can be performed by using a bit-slice integrated circuit which is available under the designation 2901 made by several manufacturers (e.g., IDM 2901A-1 IC chip made by National Semiconductor Corporation of Santa Clara, Calif.). An "AND" operation (for a 4-bit slice) performed by such well-known circuit can be described as follows. Let the bits of the 4-bit slice operands be designated as $R_0$, $R_1$, $R_2$, $R_3$ and $S_0$, $S_1$, $S_2$ and $S_3$, respectively. For such AND operation, the propagate ($\overline{P}$) output is "low" and the generate ($\overline{G}$) output is defined by the Boolean equation:

$$G = R_0 S_0 + R_1 S_1 + R_2 S_2 + R_3 S_3$$

and the carry out (CRYOUT) output is defined by the Boolean equation:

$$CRYOUT = CRYIN + R_0 S_0 + R_1 S_1 + R_2 S_2 + R_3 S_3$$

The rounding operation to be described in accordance with the invention herein makes use of the above-described operation of the 2901 IC circuit in providing a rounding technique which avoids the extra time normally required in conventional rounding techniques which effectively require a multiplexing operation when inserting the round bit at the proper slice (as discussed in the aforesaid Rosen application).

Thus, the invention recognizes that in the above operation of the 2901 unit, if one of the operands is zero and the unit is performing an AND operation the carry in bit is propagated through the slice as the carry out bit so that

CRYOUT=CRYIN

P=1 (e,ovs/P/ is low)

G=∅ (G̅ is high)

That is, whatever is inserted as a CRYIN bit to the 4-bit slice effectively from the next lower adjacent 4-bit slice is propagated directly through the slice and is provided as the CRYOUT bit thereof. In an actual circuit implementation, for example, this propagation can be accomplished by carry look-ahead circuits. Carry look-ahead circuits will propagate a carry (P=1) bit, but not generate one (G=∅).

Therefore, in order to add the round bit into the appropriate bit position, bit 23 for a single precision mantissa computation and bit 55 for a double precision mantissa computation, the round bit (suitably calculated as described, for example, in the aforementioned Rosen application) can be inserted at bit 63 (the least significant bit) as the CRYIN bit of the lower 4-bit slice.

For a single precision mode for each of the middle eight 4-bit slices (bits 24–55) and the lower two 4-bit slices (bits 56–63), one of the operands is set to zero and each is controlled to perform an AND operation so that whatever is inserted as a CRYIN bit at bit 63 is propagated effectively through each of such slices as a CRYOUT bit.

Accordingly, if the round bit is added as the "carry in" bit CRYIN, such round bit is propagated effectively through the lower two and the middle eight 4-bit slices so as to be added as the carry in bit CRY24 at bit 23 of 4-bit slice 20-23 (the lowest 4-bit slice of the unrounded result) so that the rounding operation is performed without the need to utilize an effective multiplexing operation at bit 23.

In the same manner, for a double precision floating point mantissa computation, the lower two slices (bits 56–63) are arranged during the rounding cycle to have one of their operands set to zero and are controlled to perform AND operations. A round bit inserted as the CRYIN bit at bit 63 is then effectively propagated through the lower two slices and inserted as the carry in bit CRY56 (the round bit) at bit 55 of the lower 4-bit slice (bits 52–55) of the unrounded result to complete the rounding of the final 56-bit floating point mantissa result.

In the same manner, during non-rounding cycles in a single precision operation, the CRYIN bit set by microcode is effectively propagated to bit 23 as described above, since according to FIG. 3 the lower ten slices have one of their operands set to zero and are controlled to perform AND operations.

Figure 2:
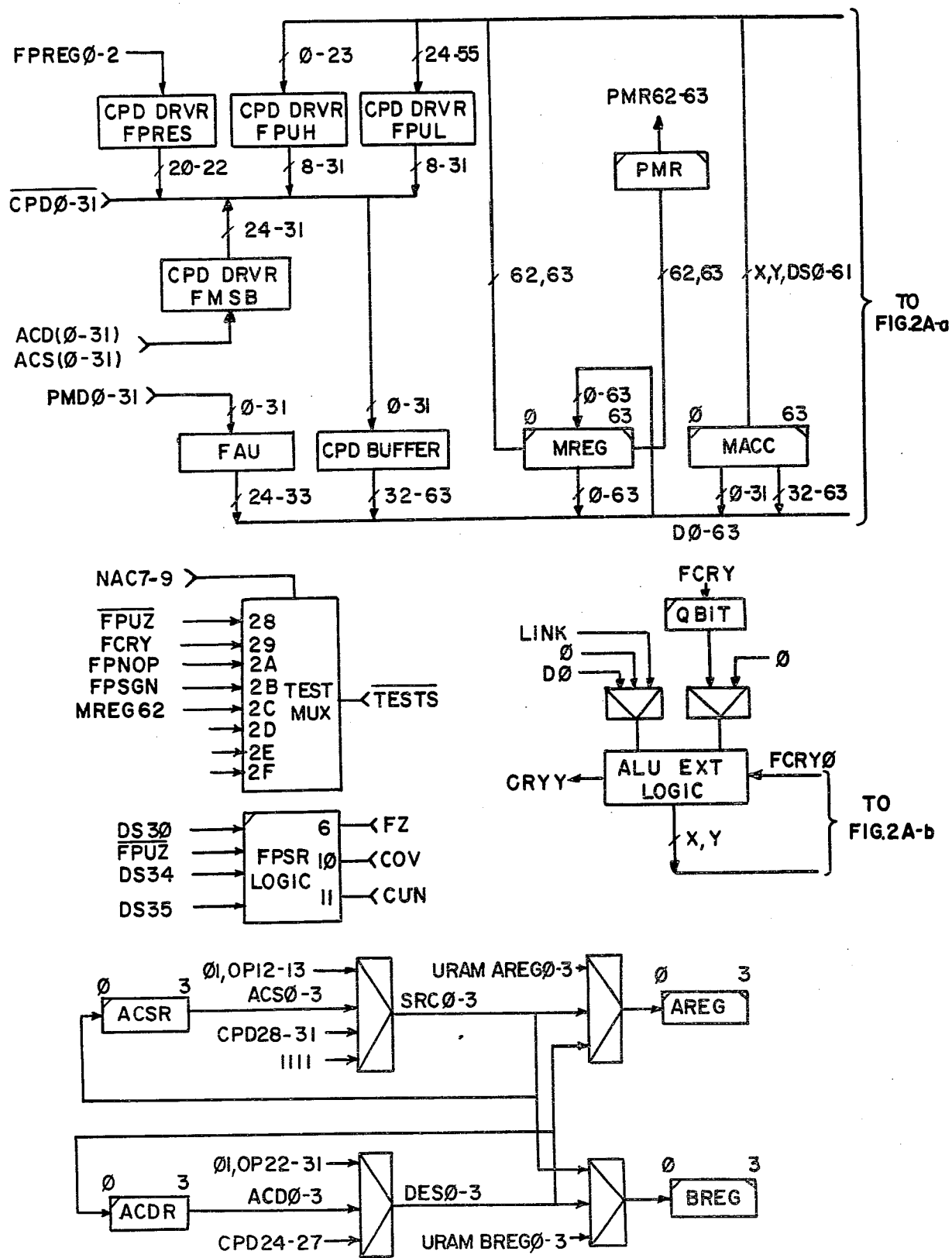
FIGS. 2 and 2A show a block diagram of a floating point computation unit in accordance with the invention.
Figure 2A:
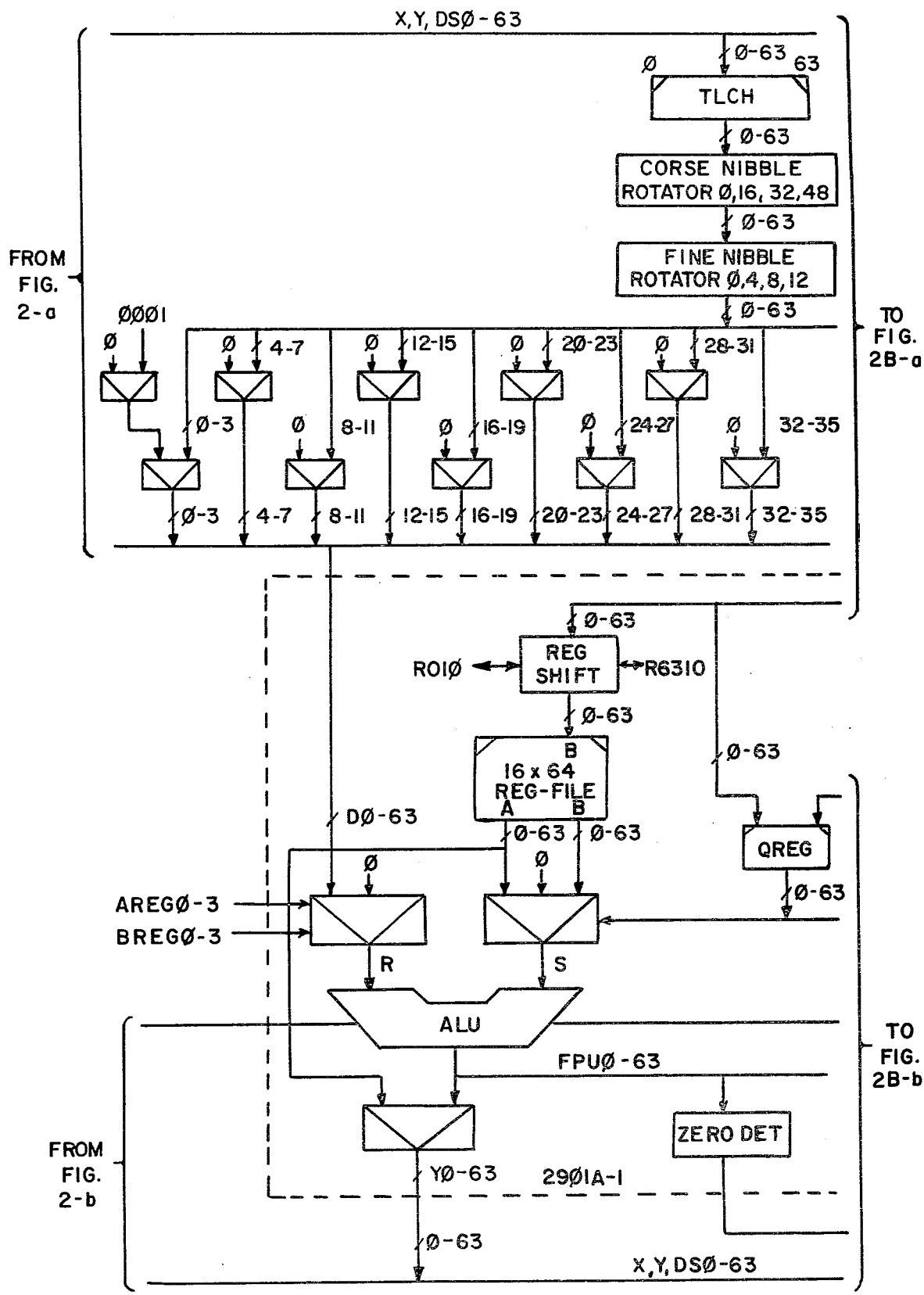
Figure 2B:
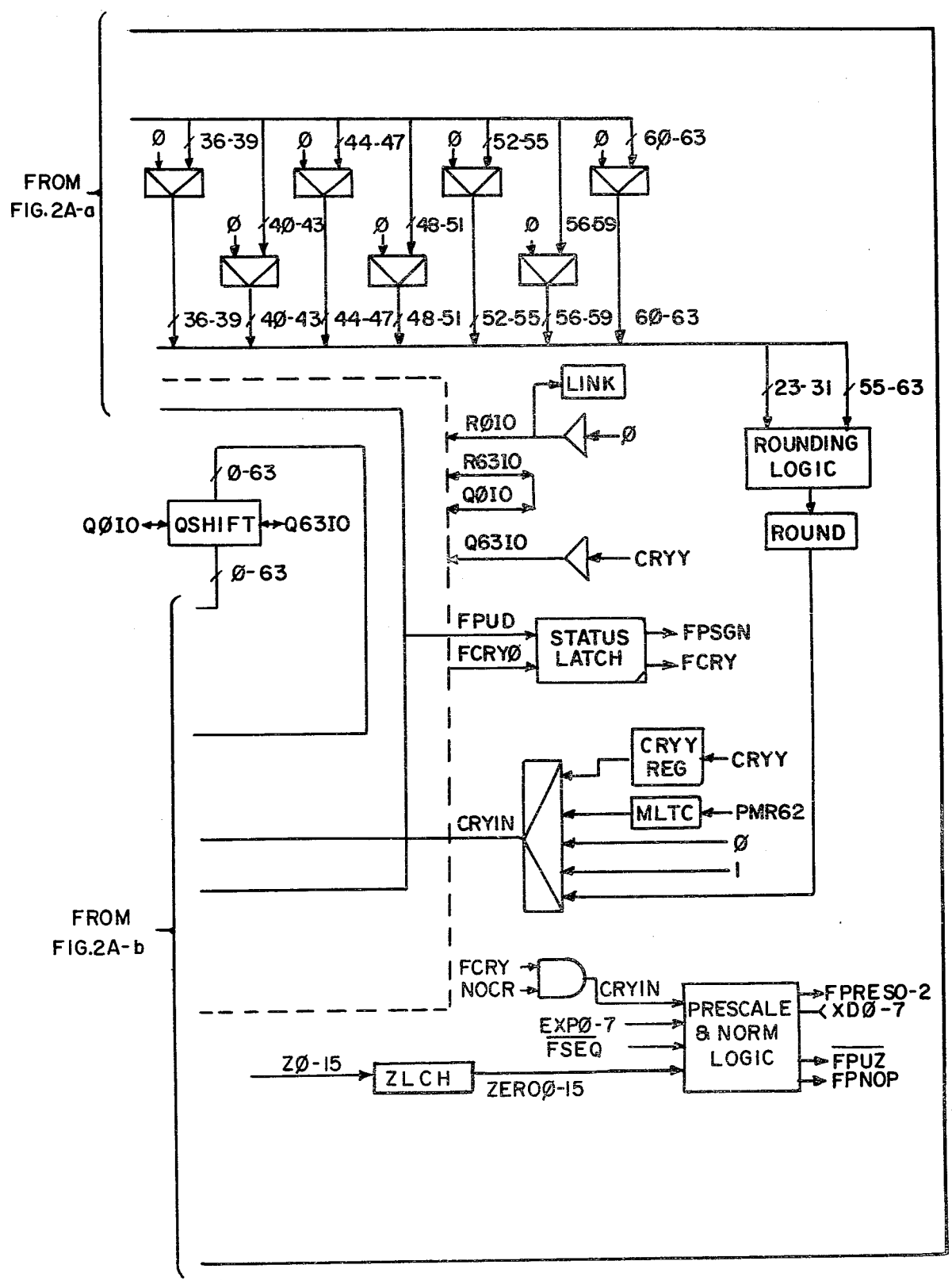
Figure 5:
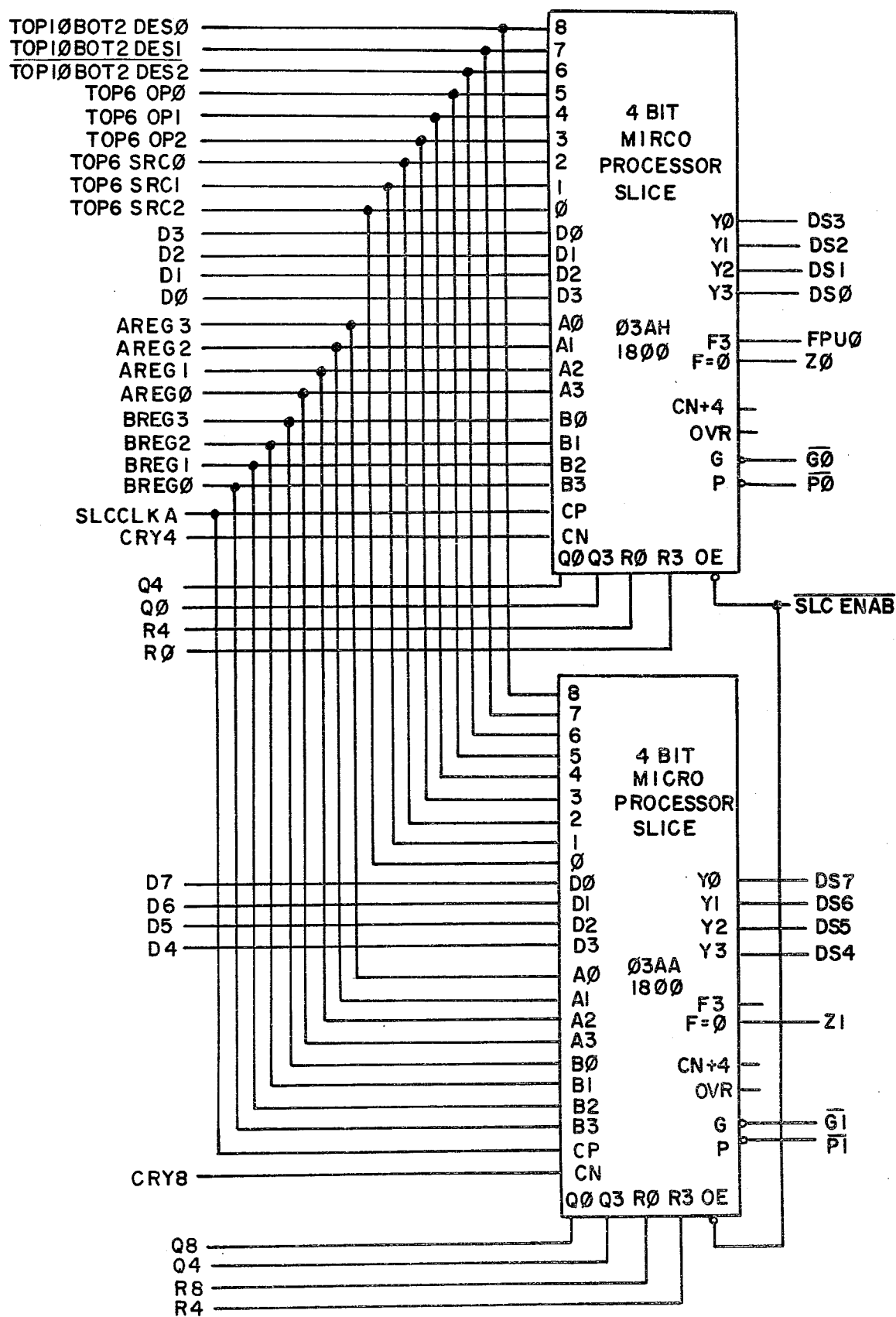
FIGS. 5–36 depict specific logic diagrams for implementing the block diagram of FIG. 2 of the floating point unit of the invention.
Figure 6:
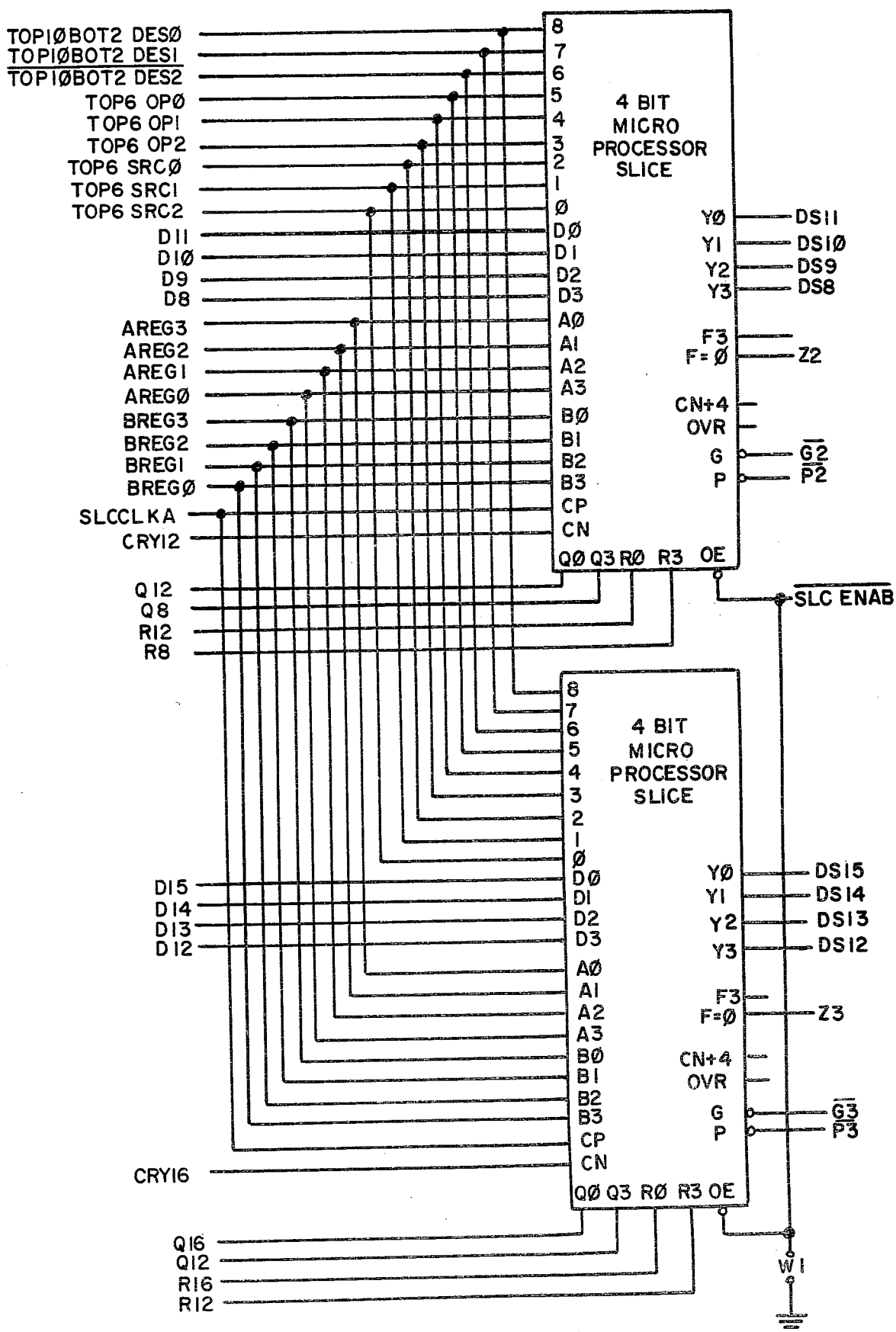
Figure 7:
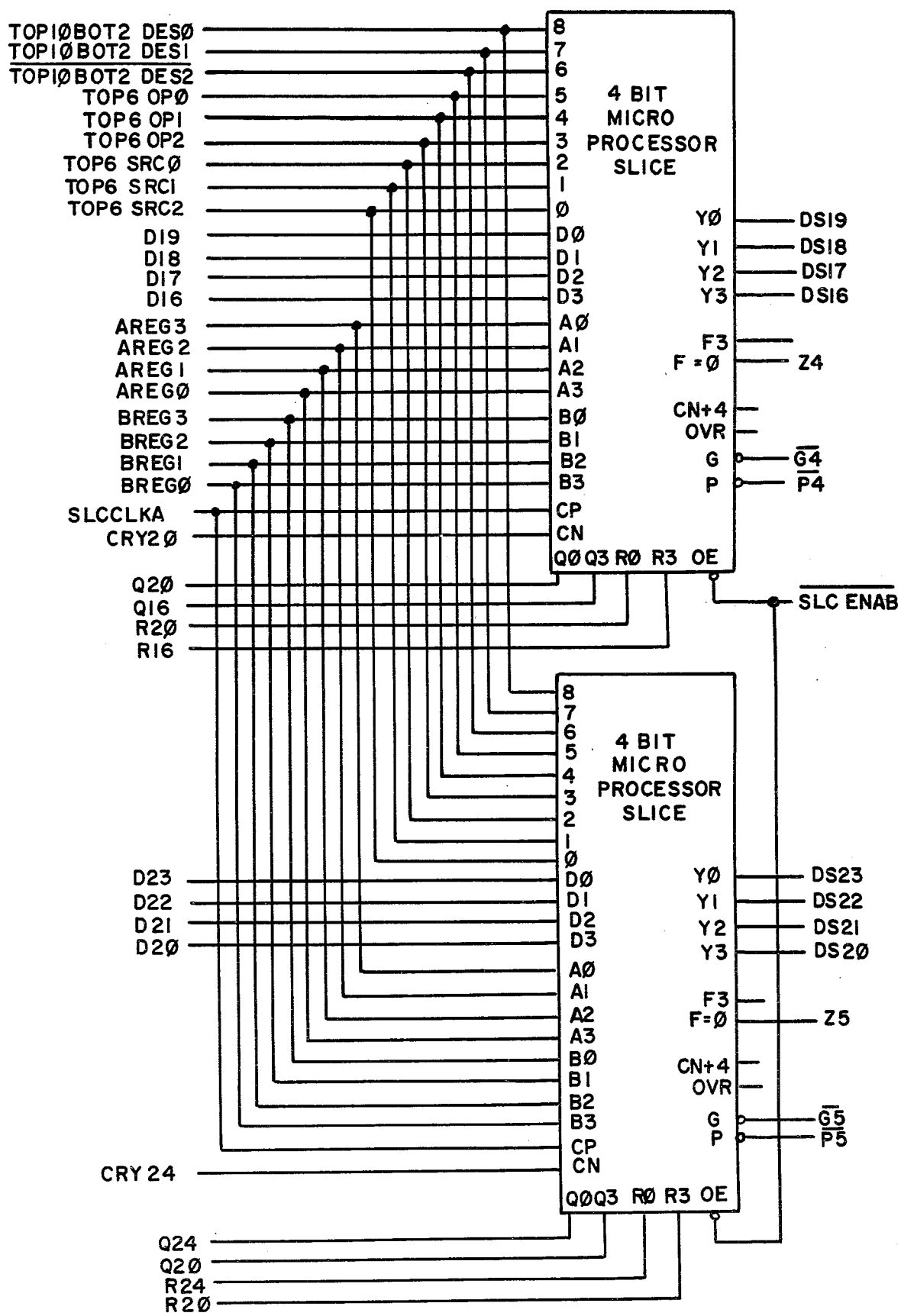
Figure 8:
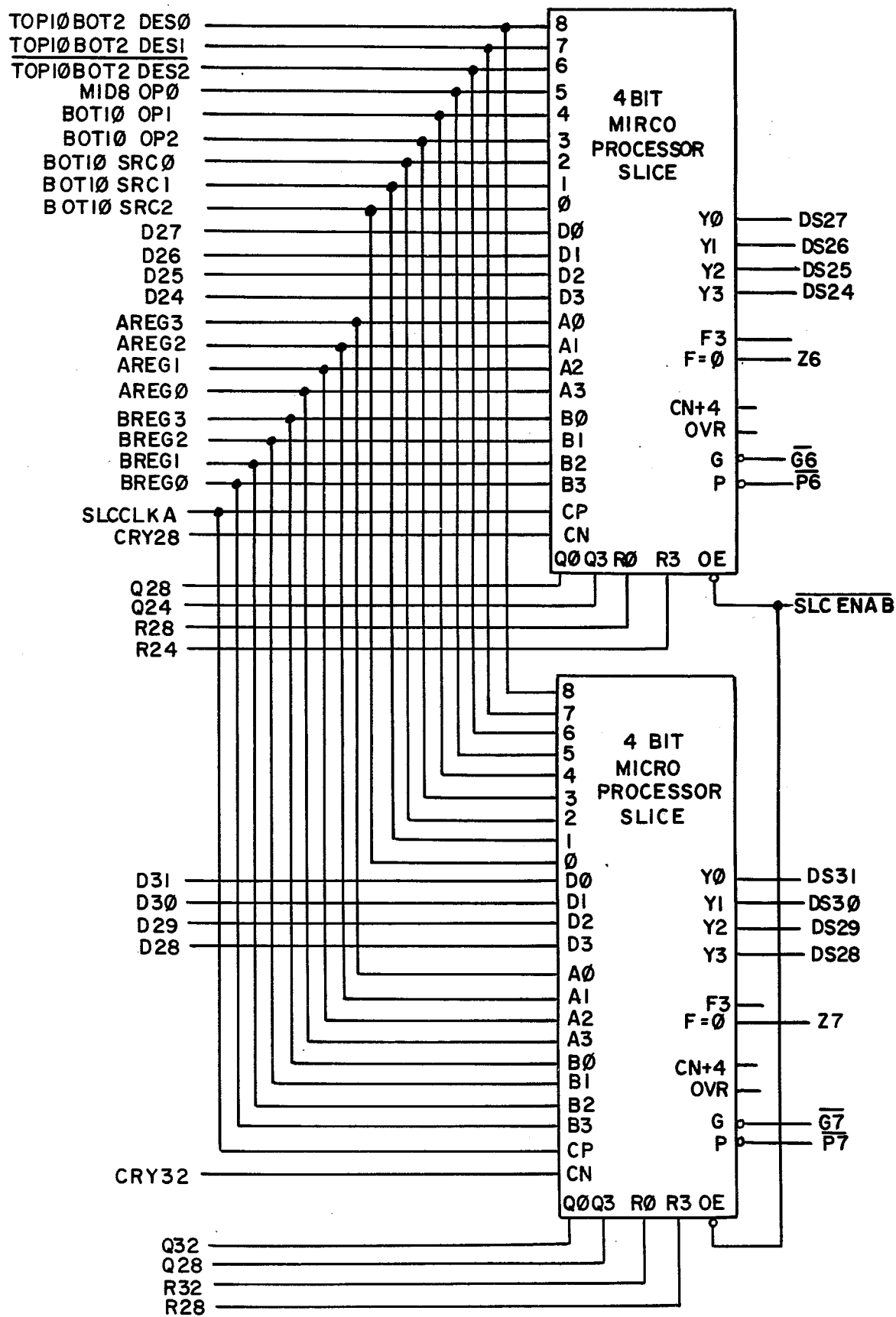
Figure 9:
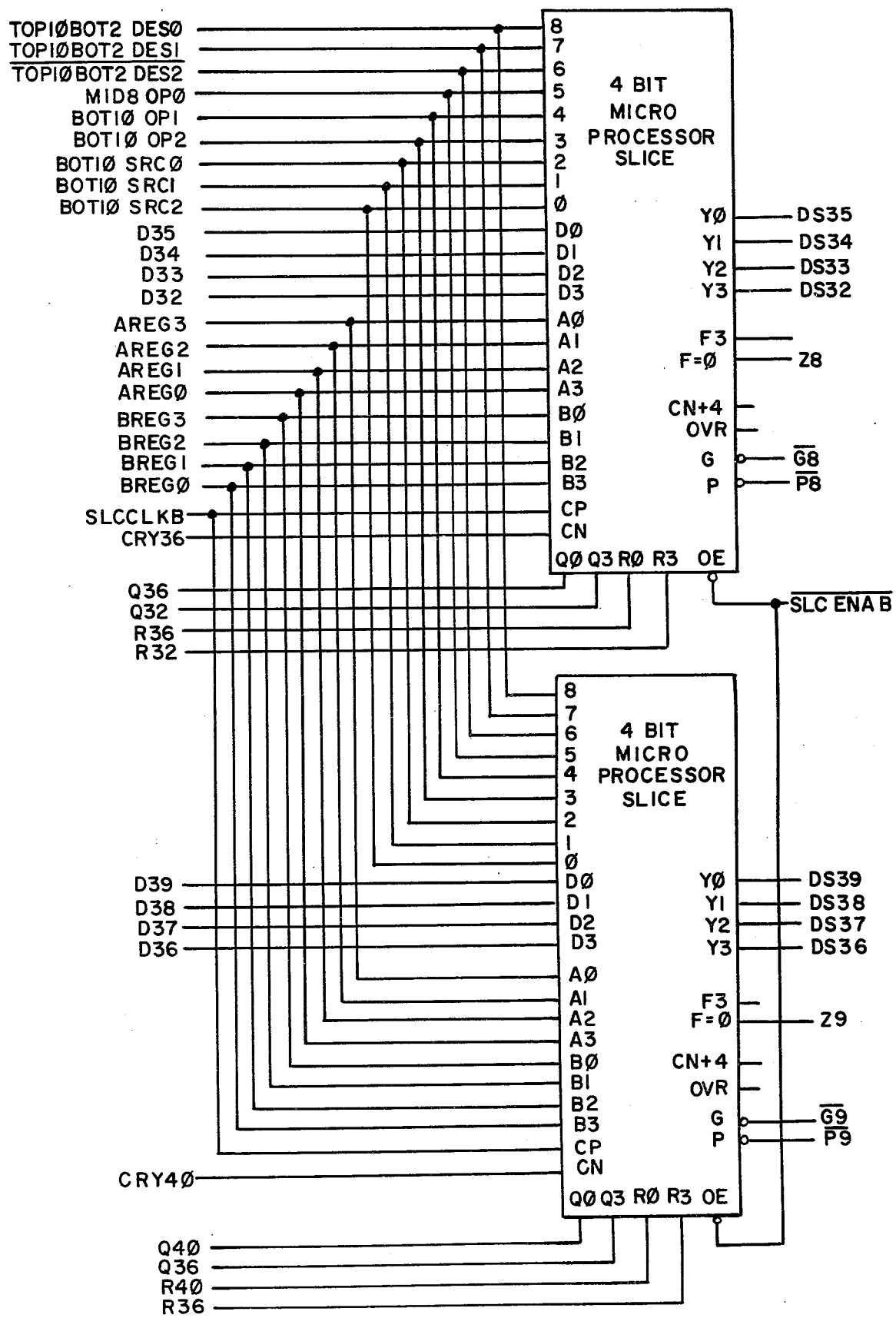
Figure 10:
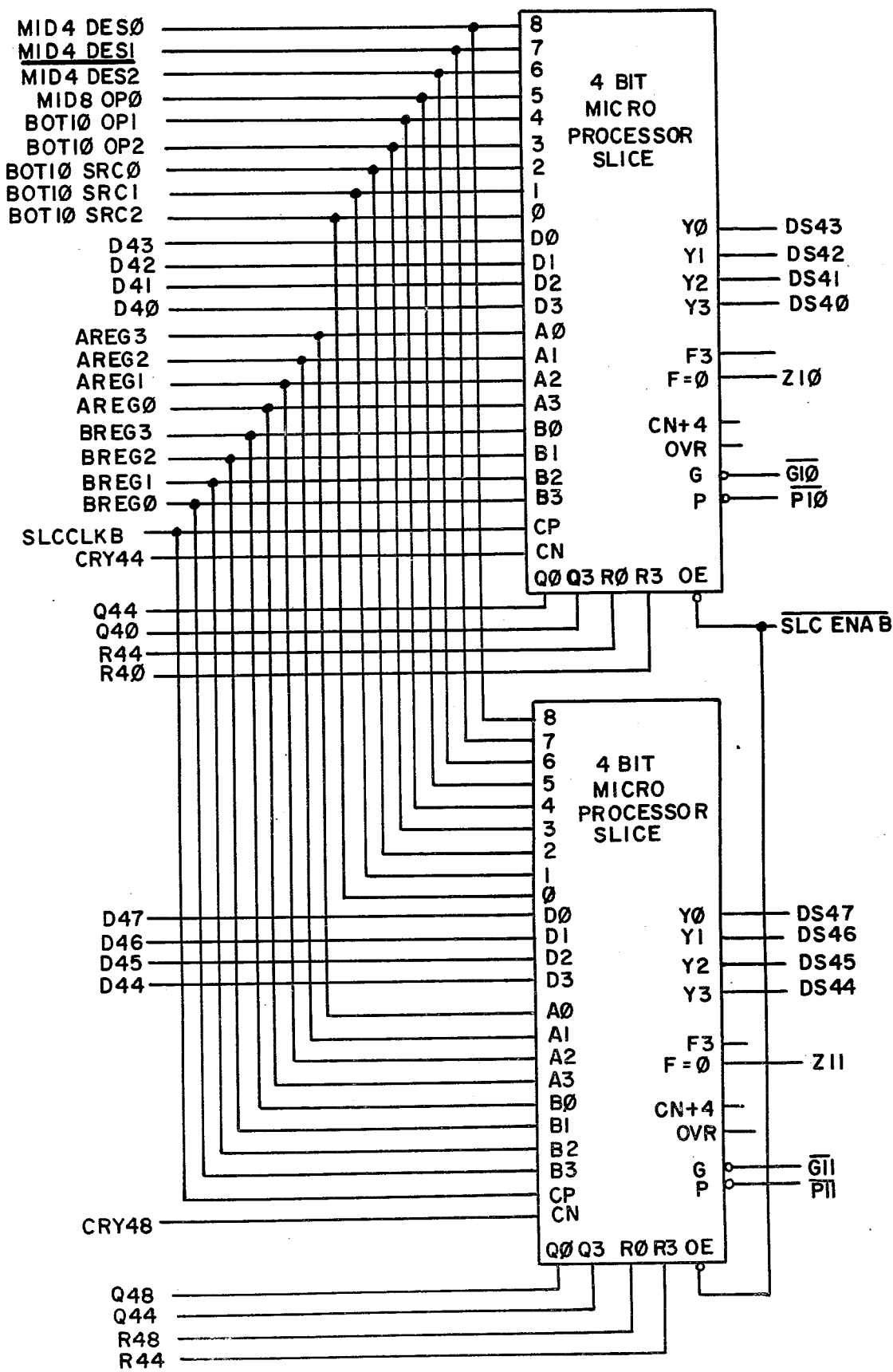
Figure 11:
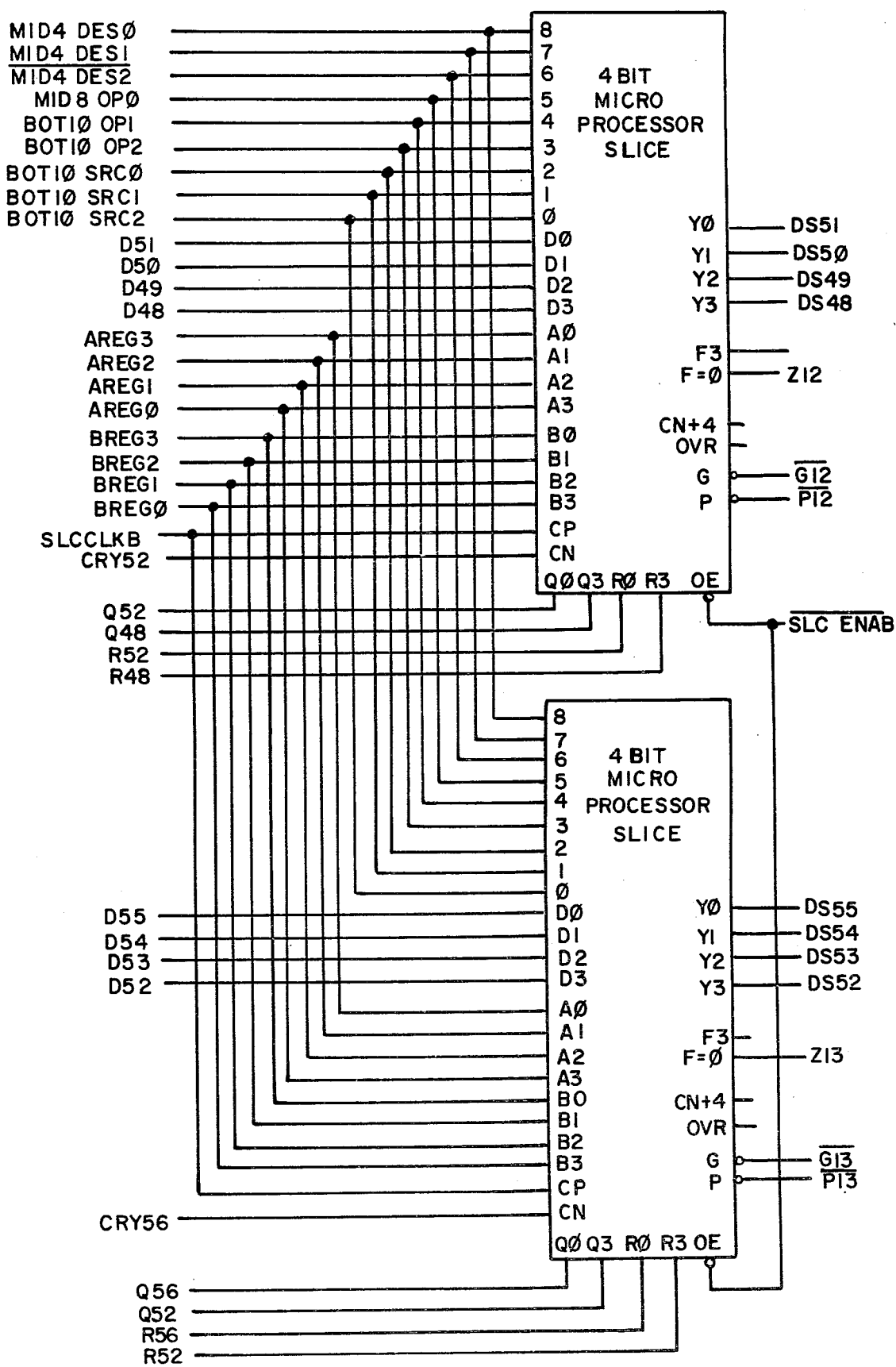
Figure 12:
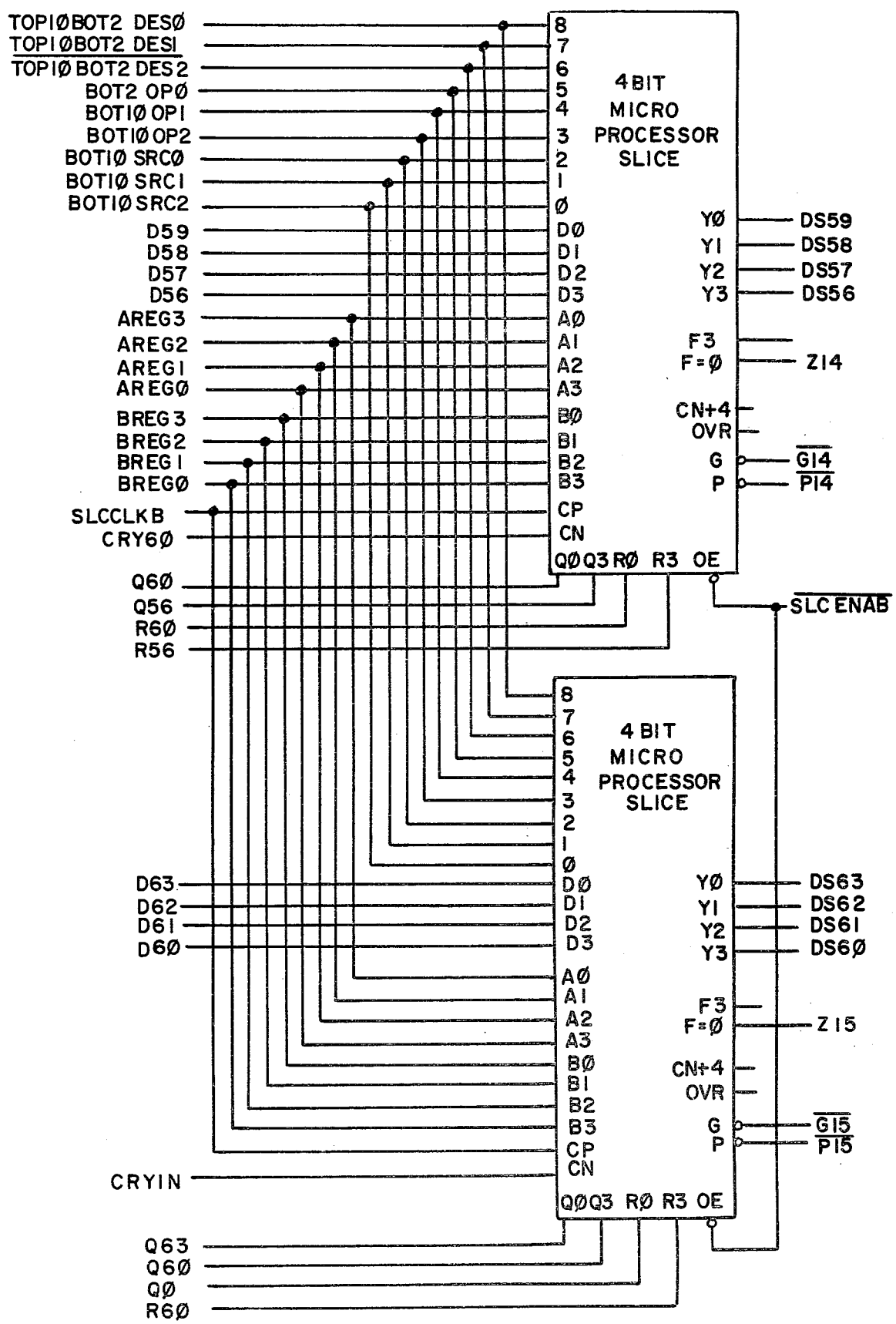
Figure 13:
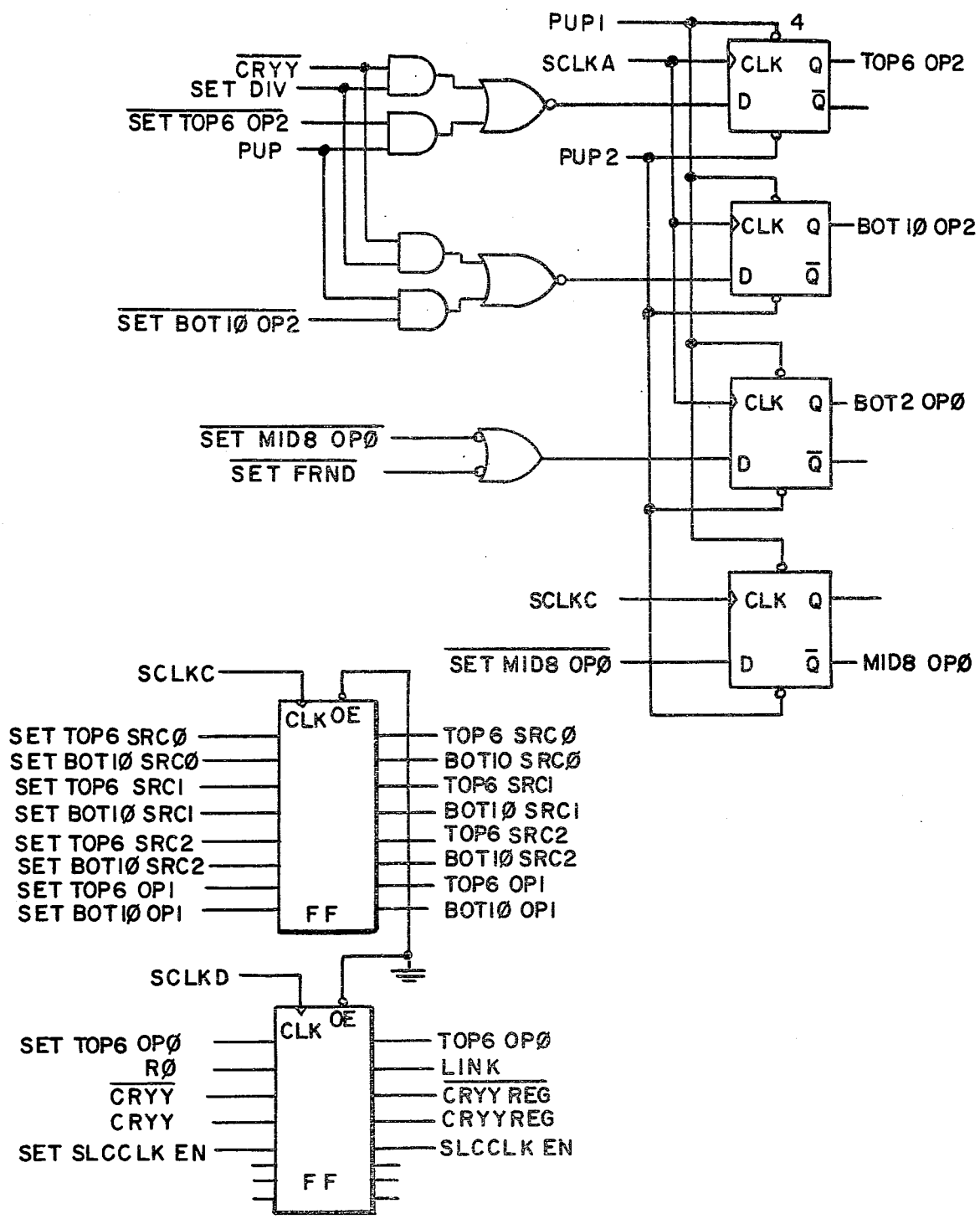
Figure 14:
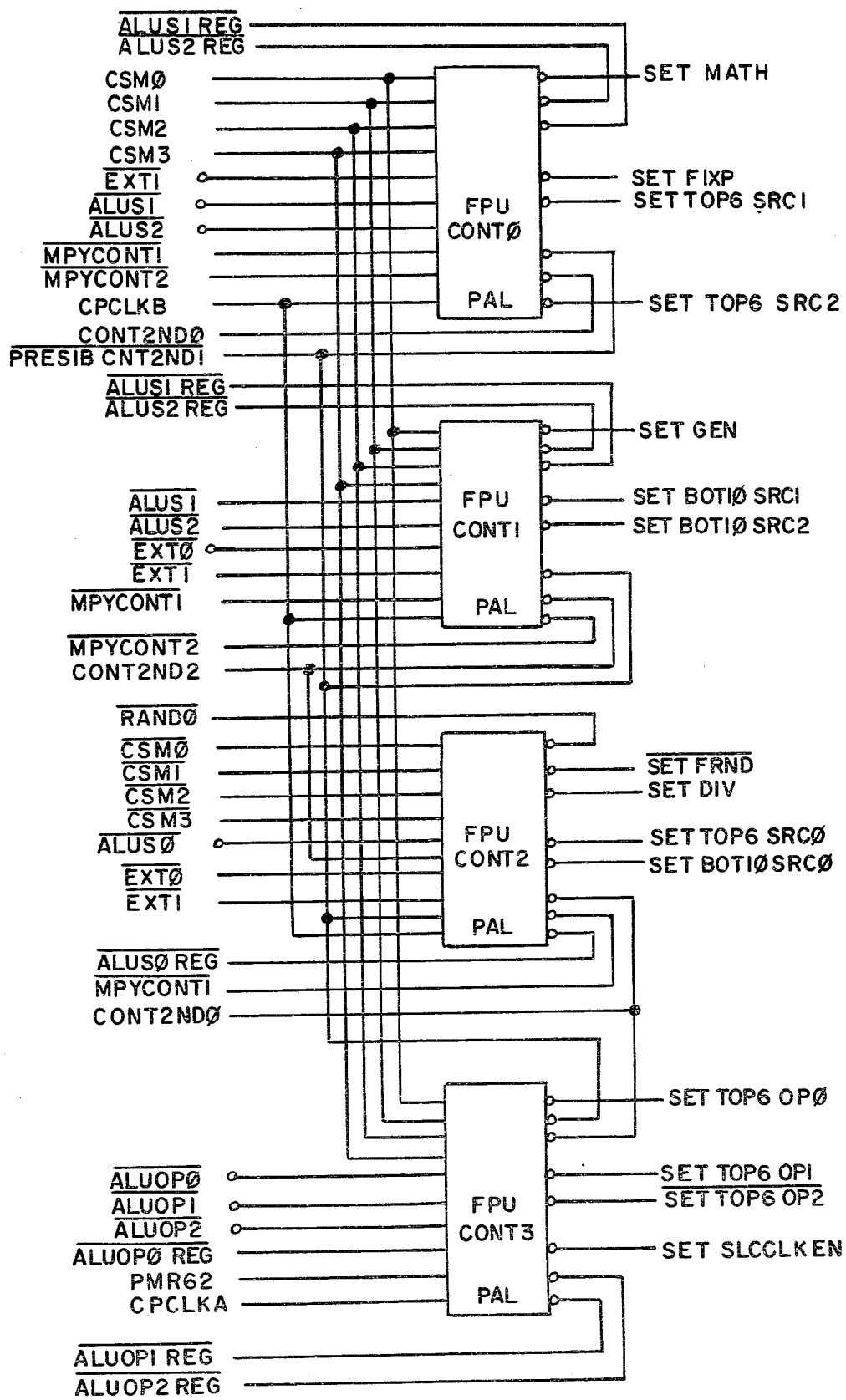
Figure 15:
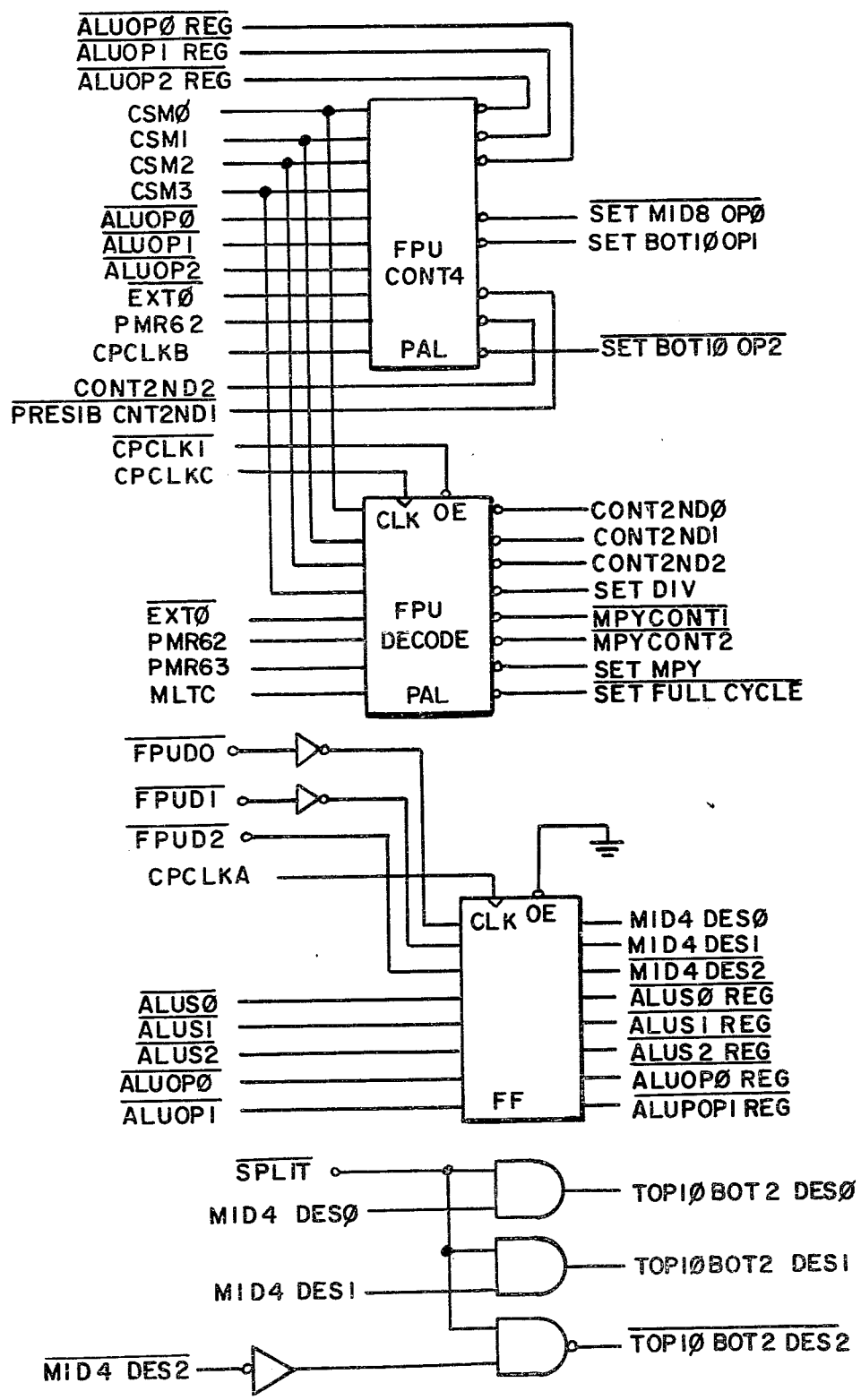
Figure 16:
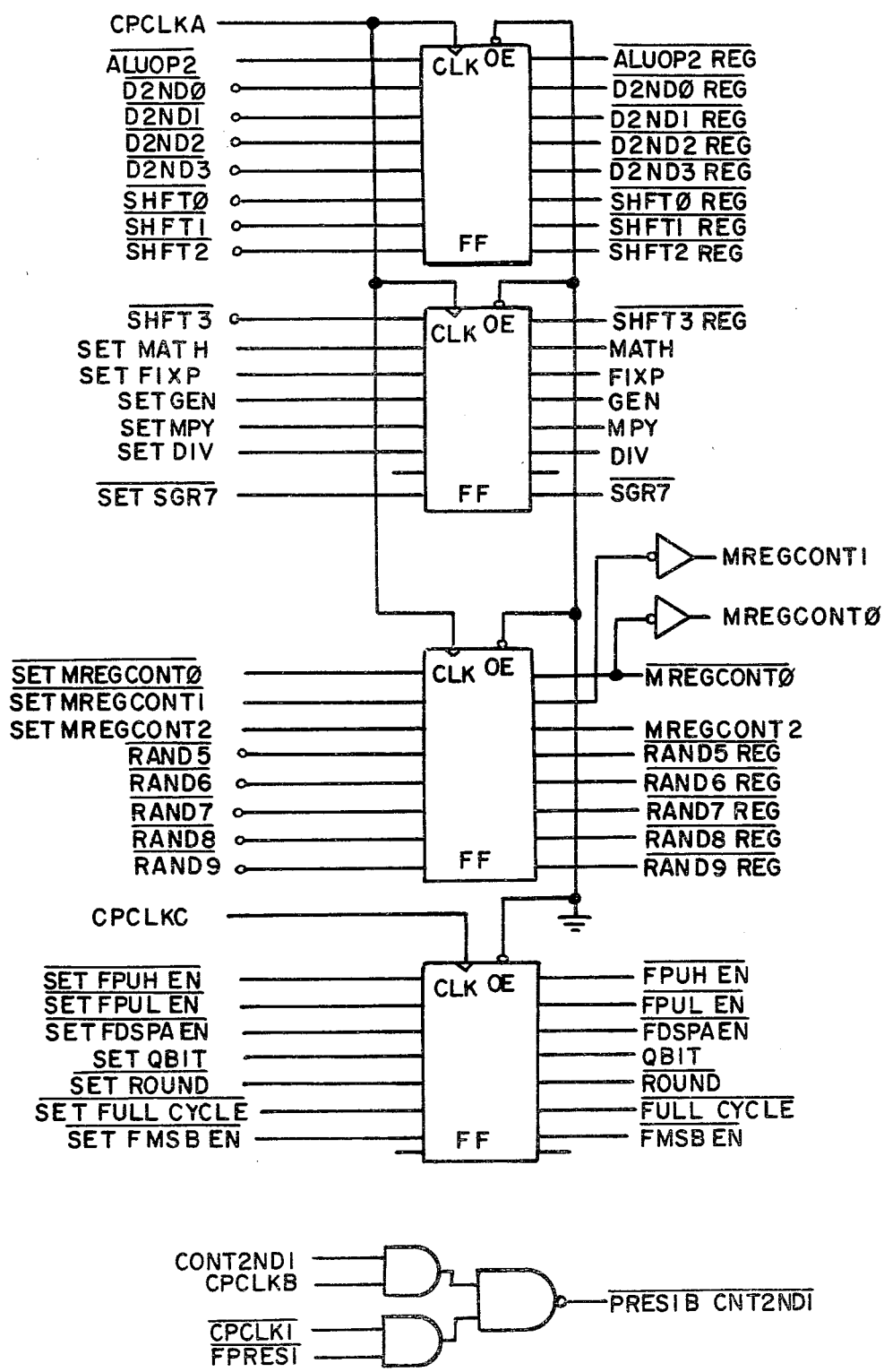
Figure 17:
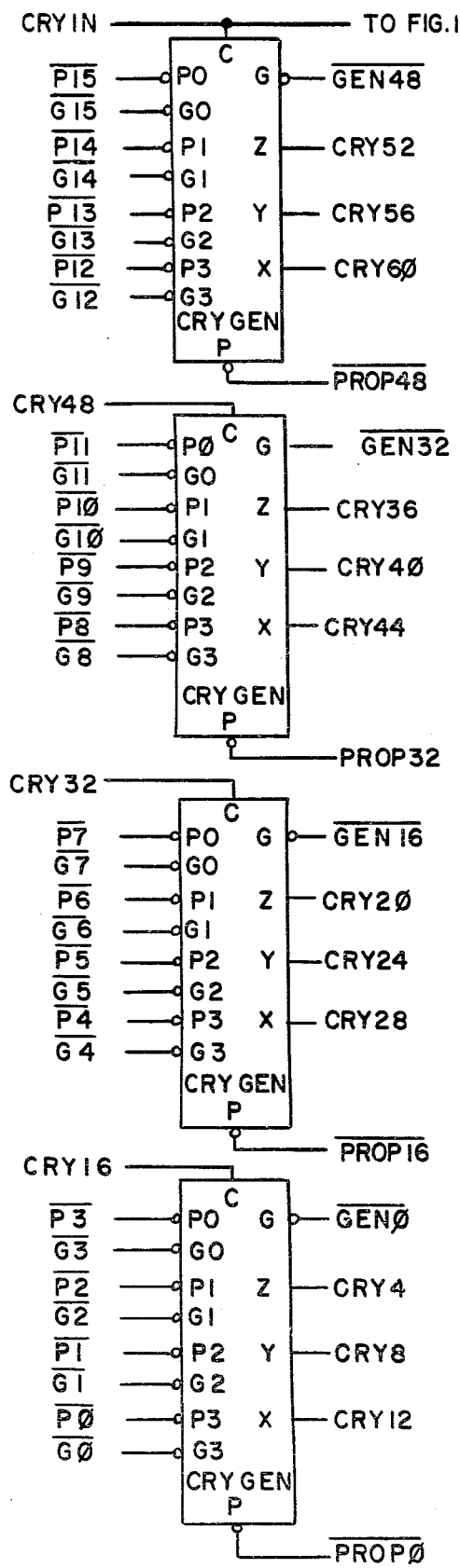
Figure 17A:
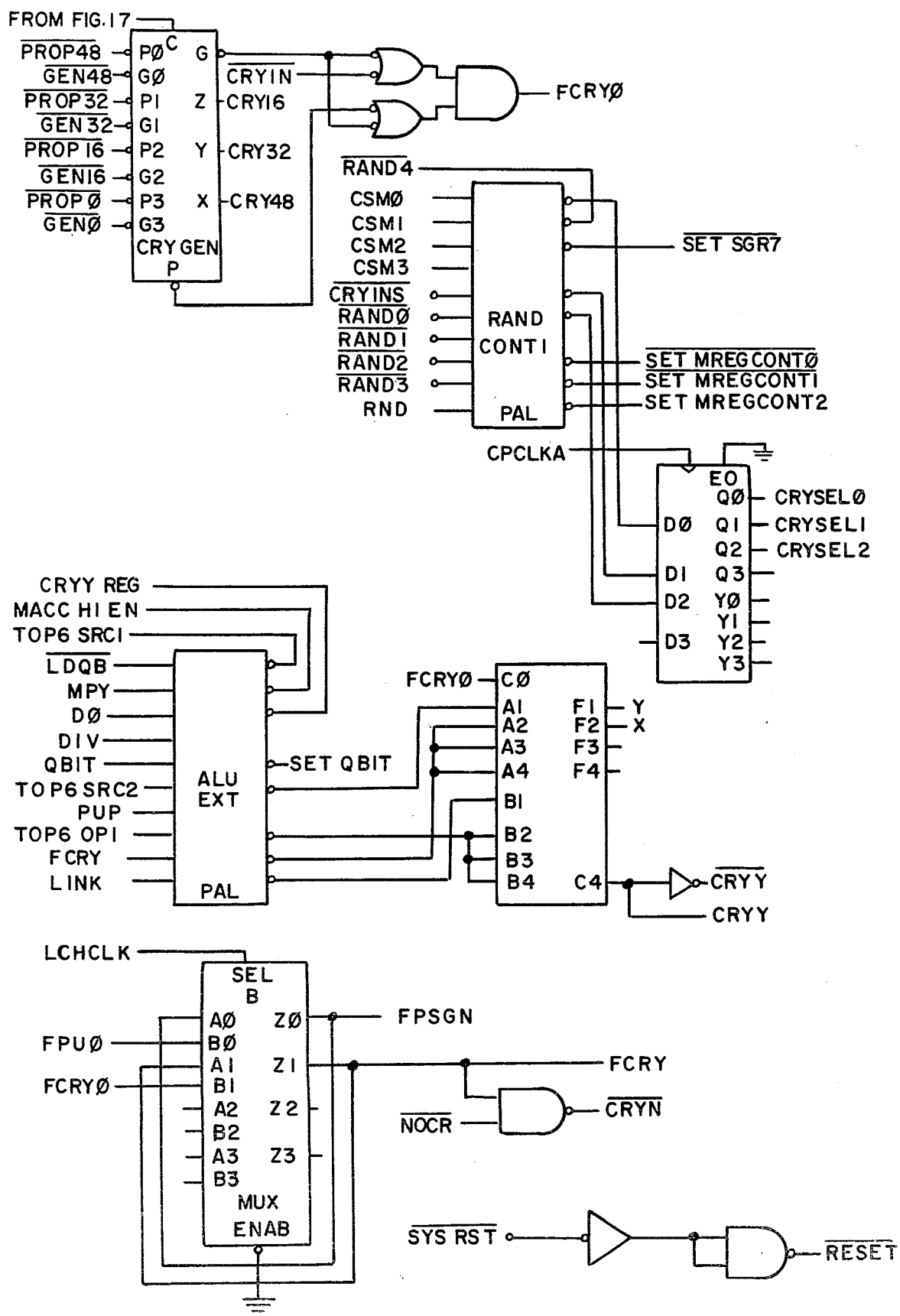
Figure 18:
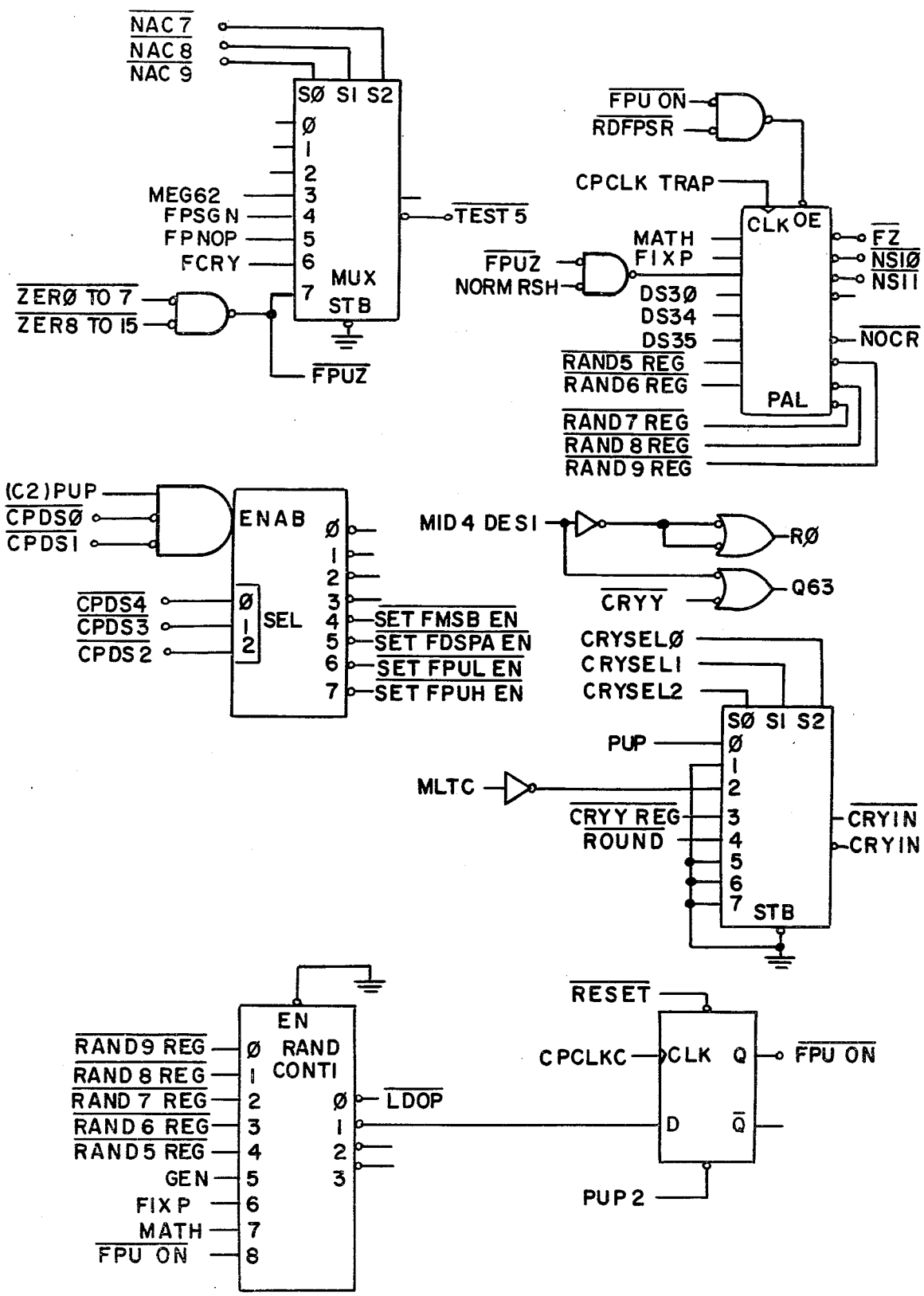
Figure 19:
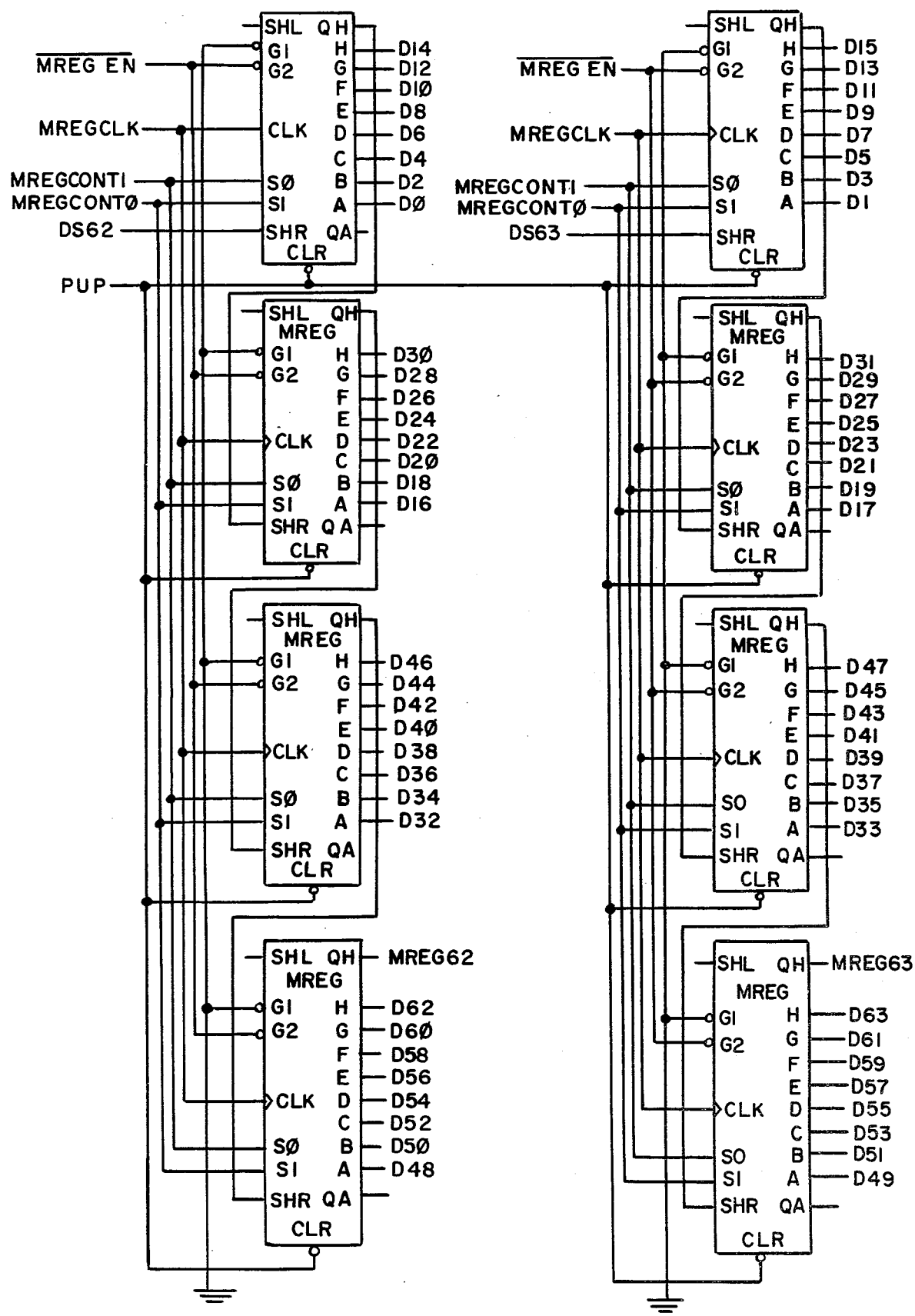
Figure 20:
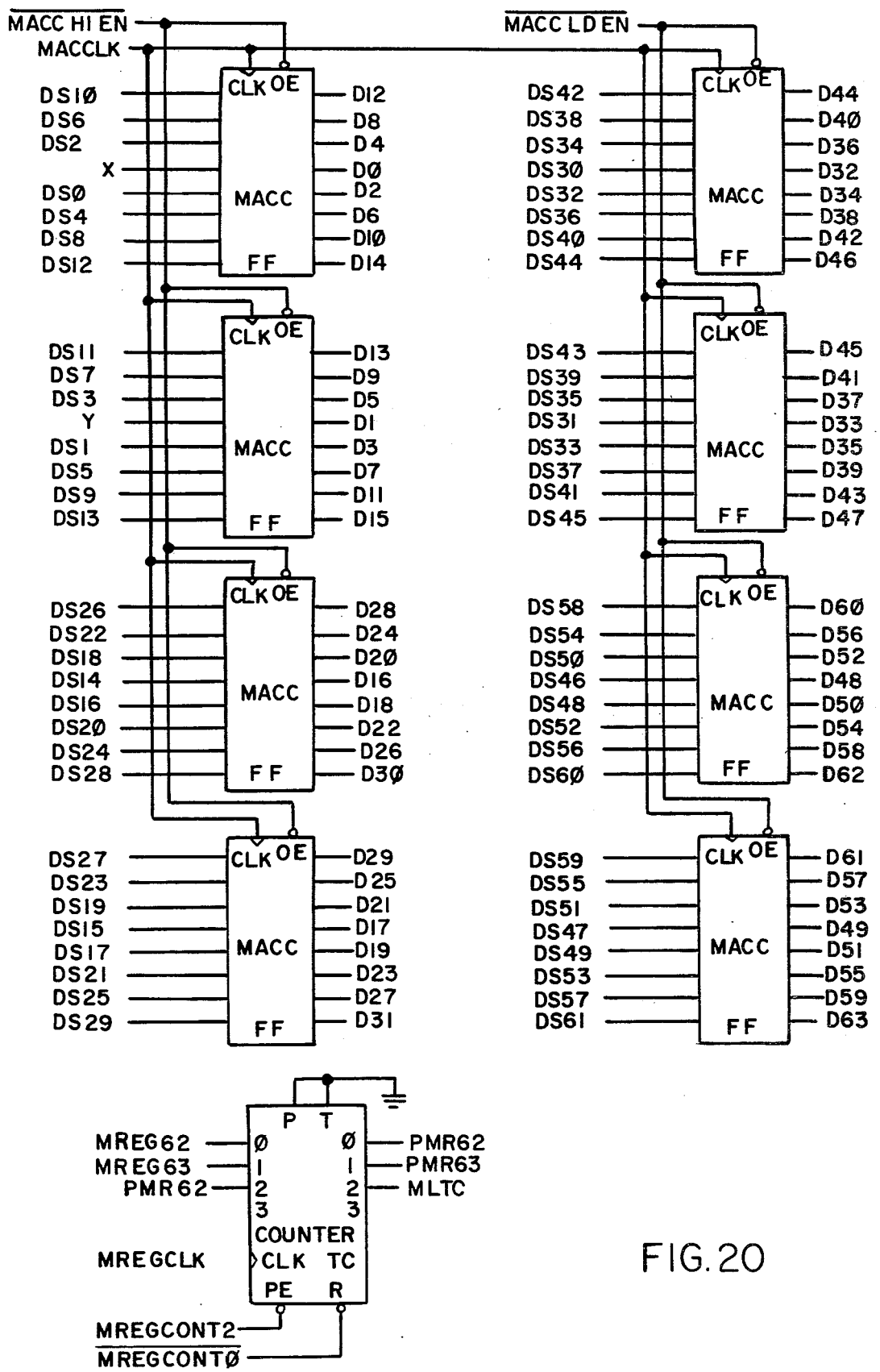
Figure 21:
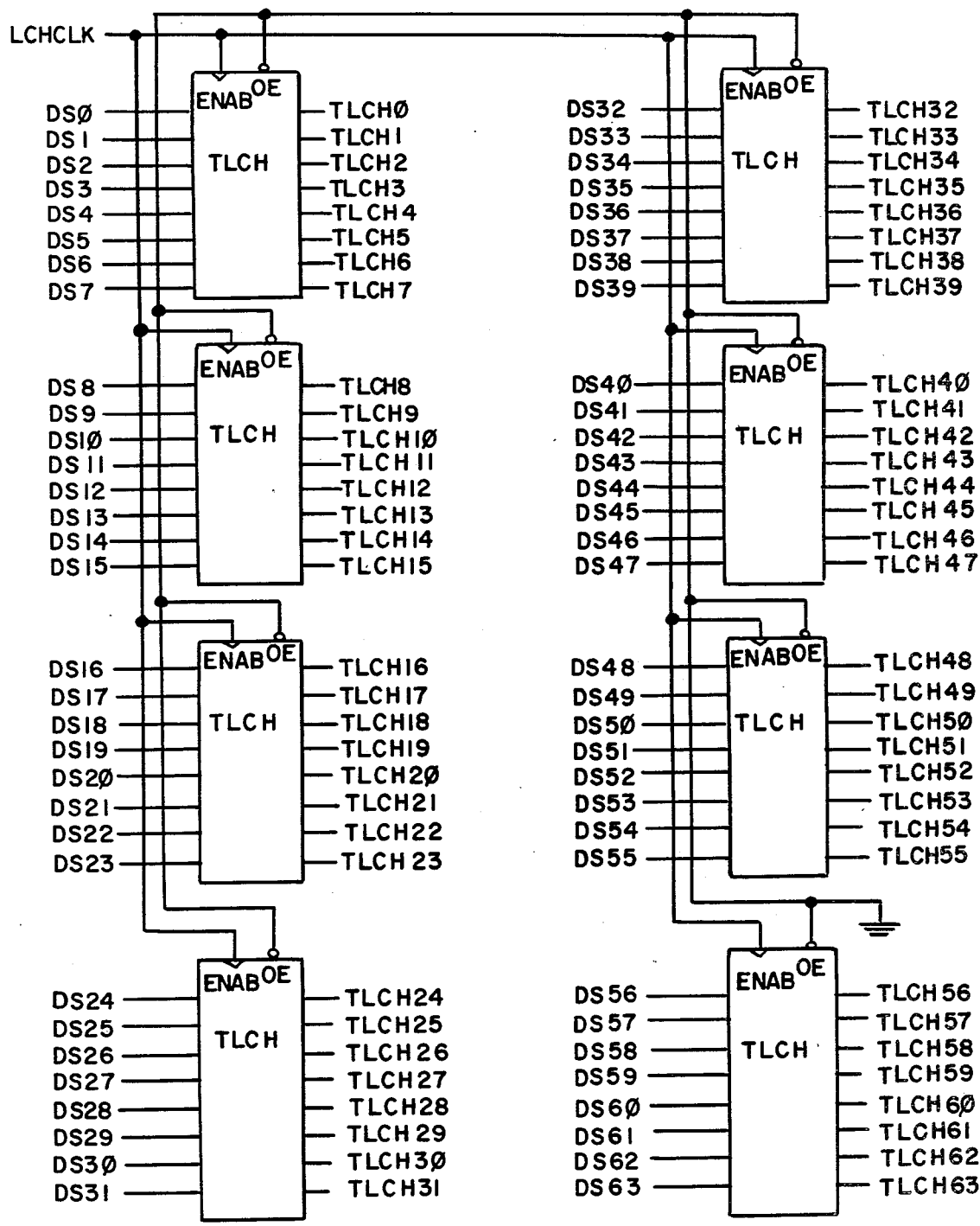
Figure 22:
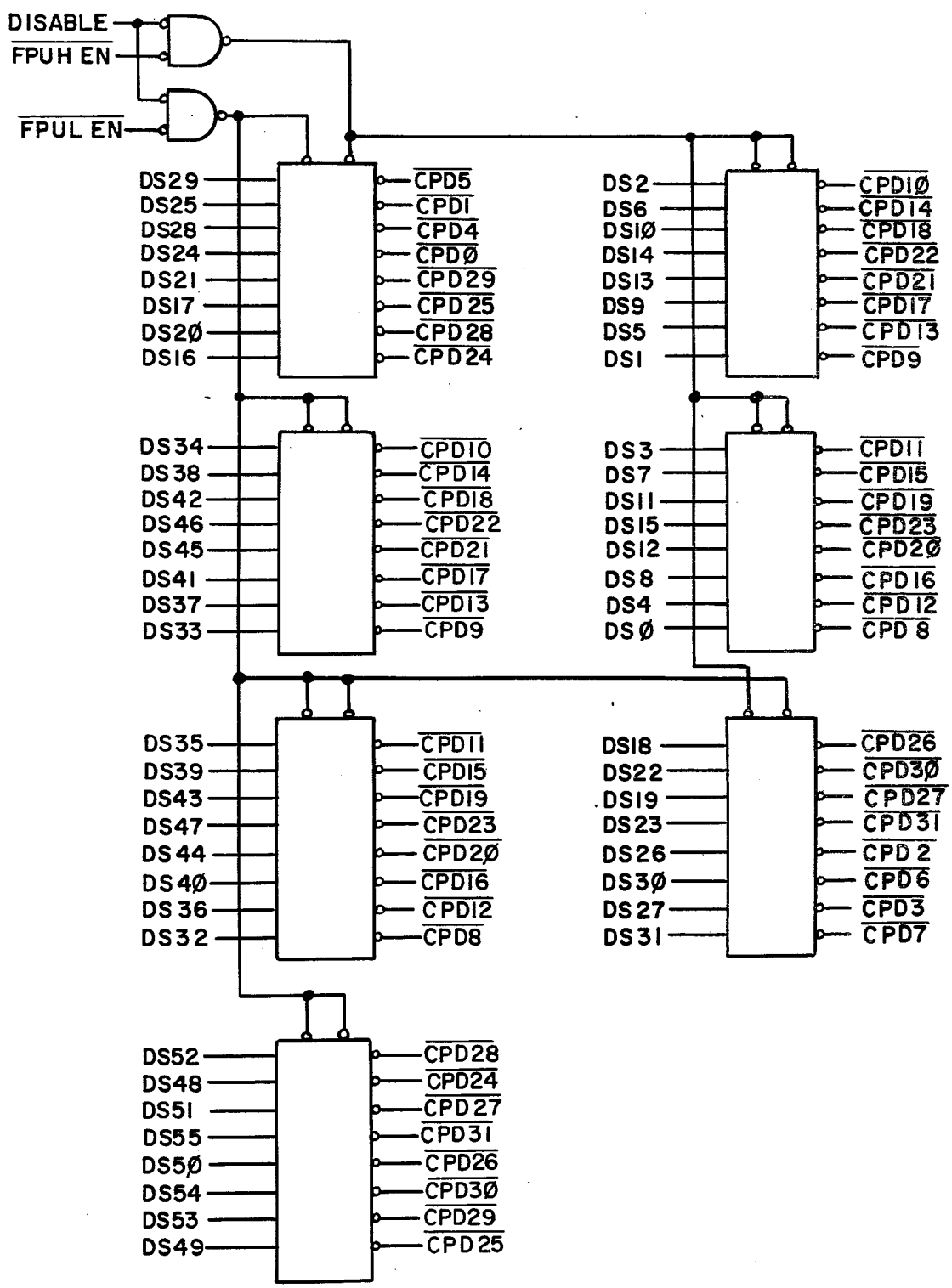
Figure 23:
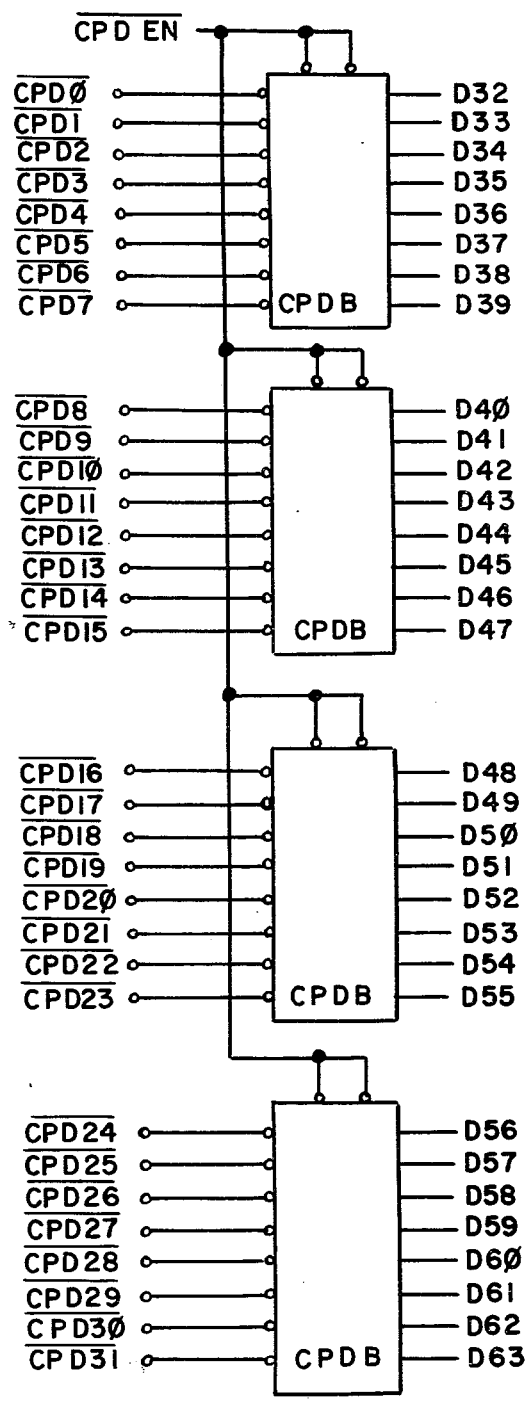
Figure 24:
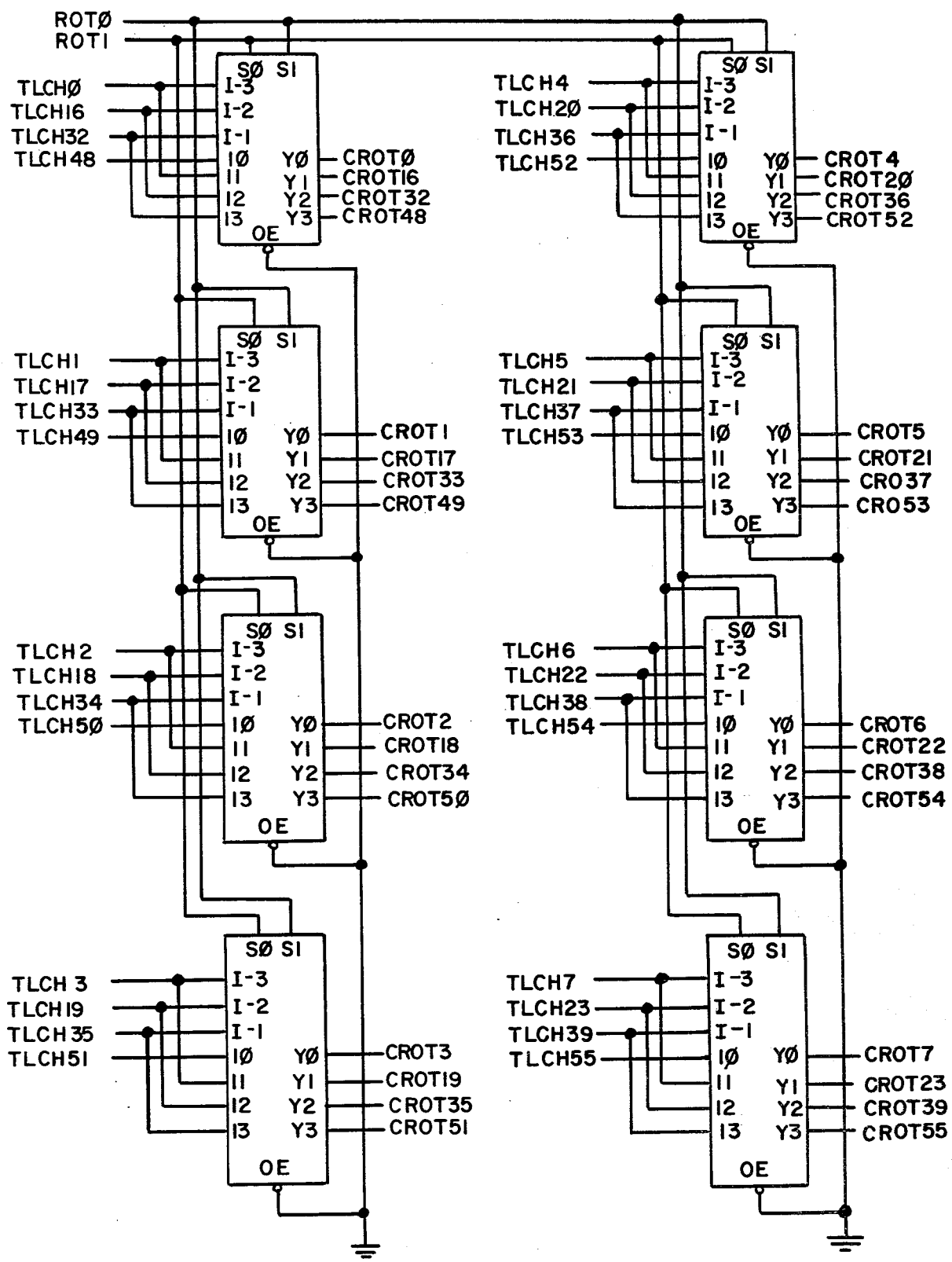
Figure 25:
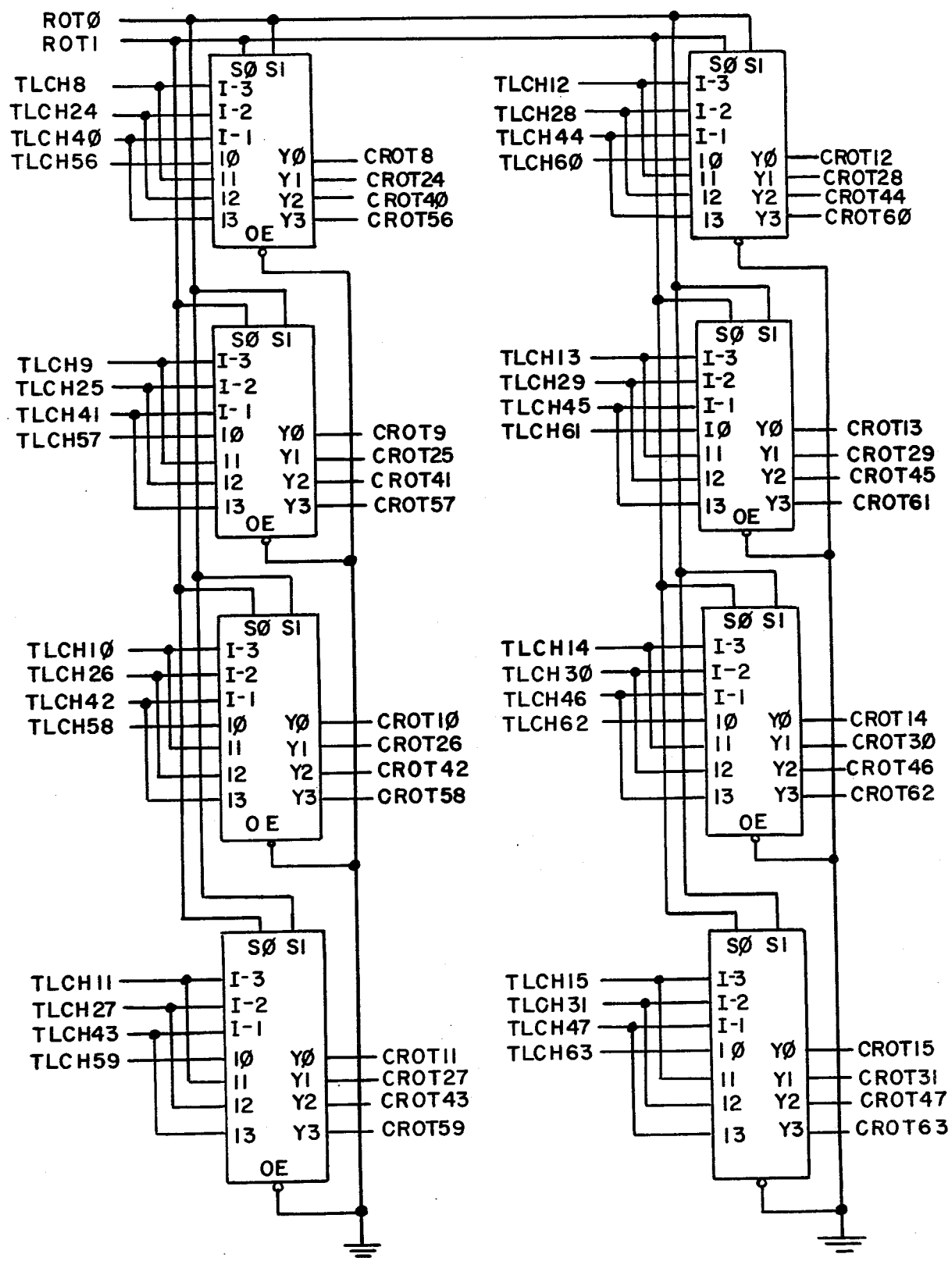
Figure 26:
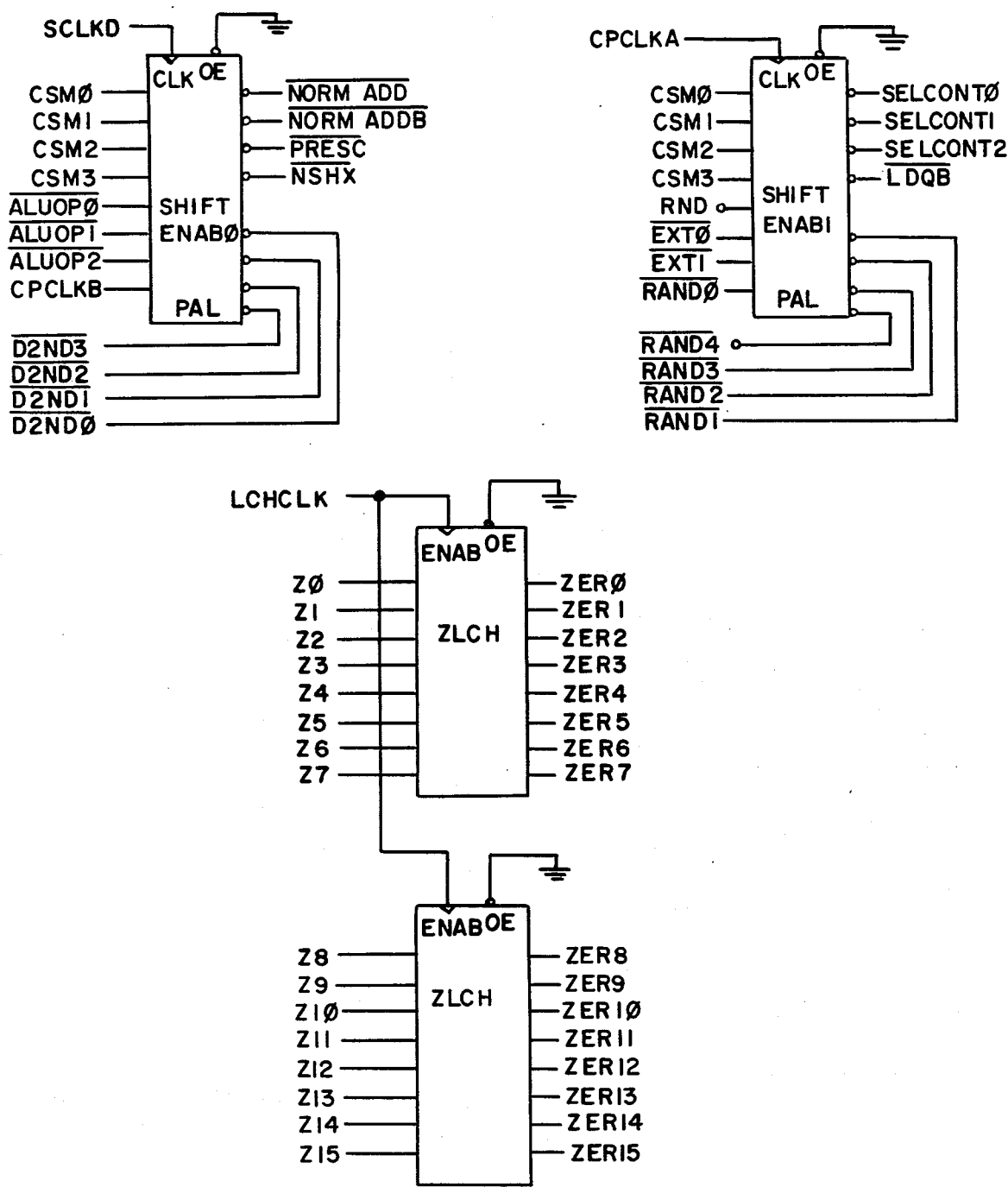
Figure 27:
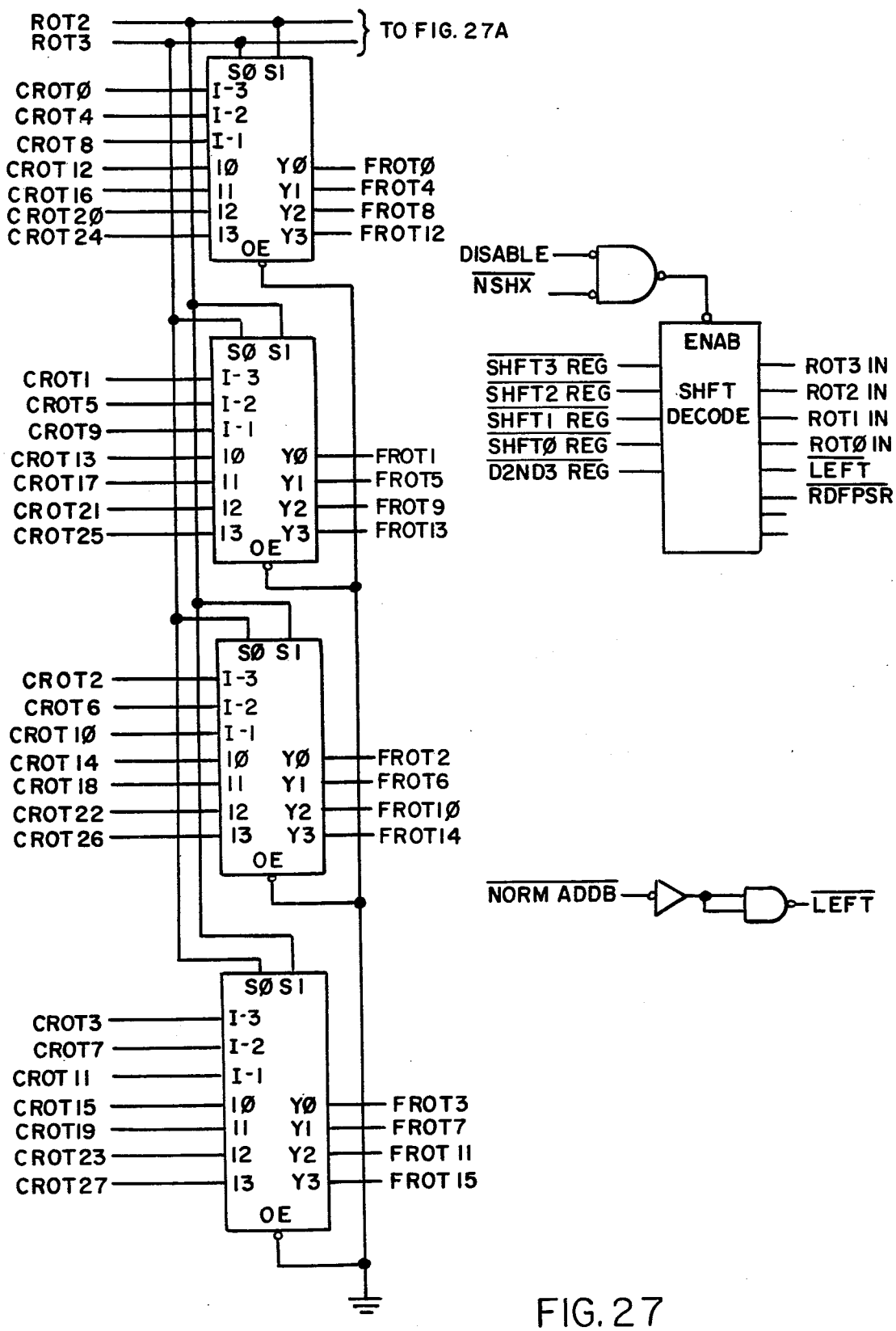
Figure 27A:
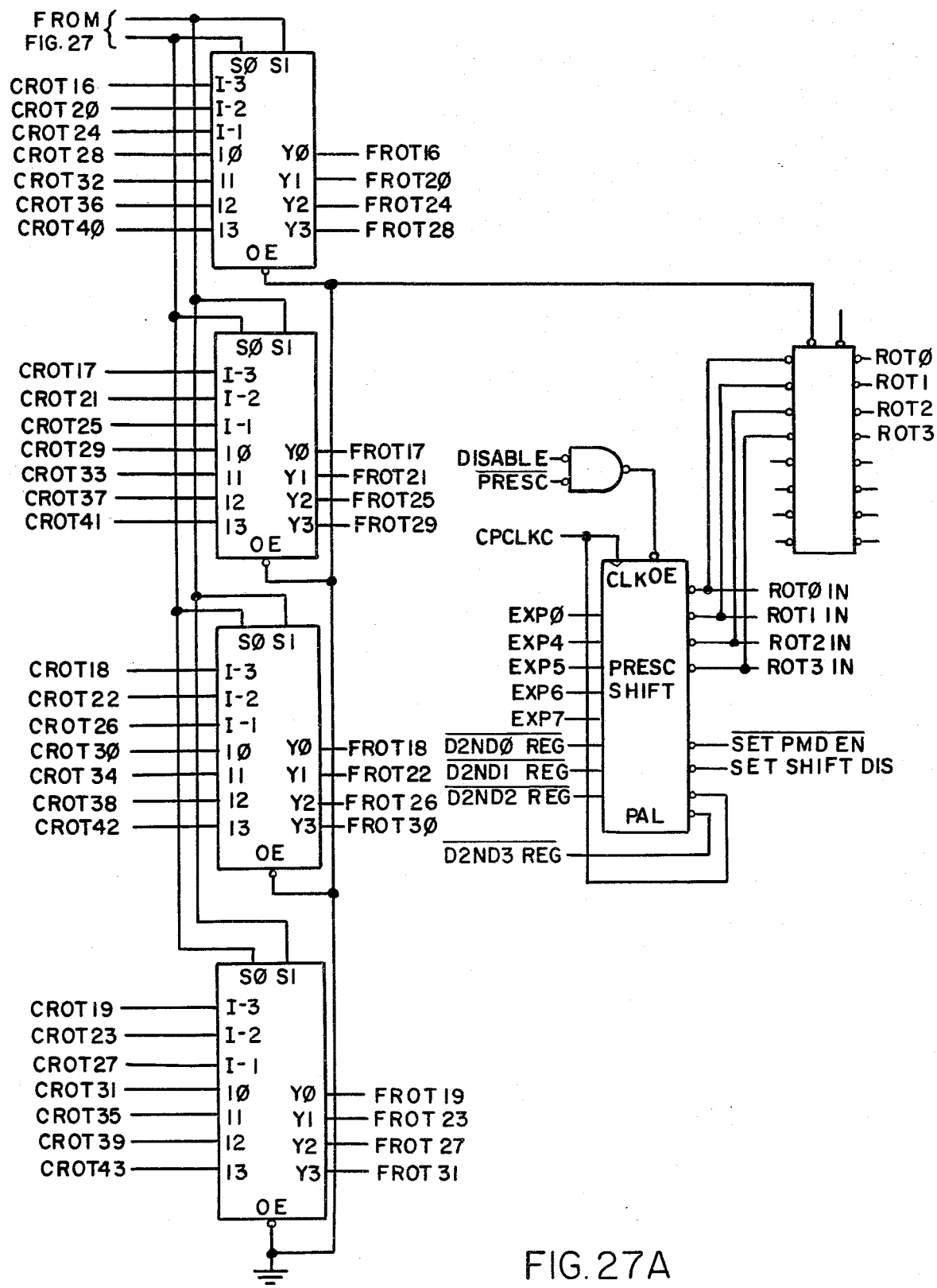
Figure 28:
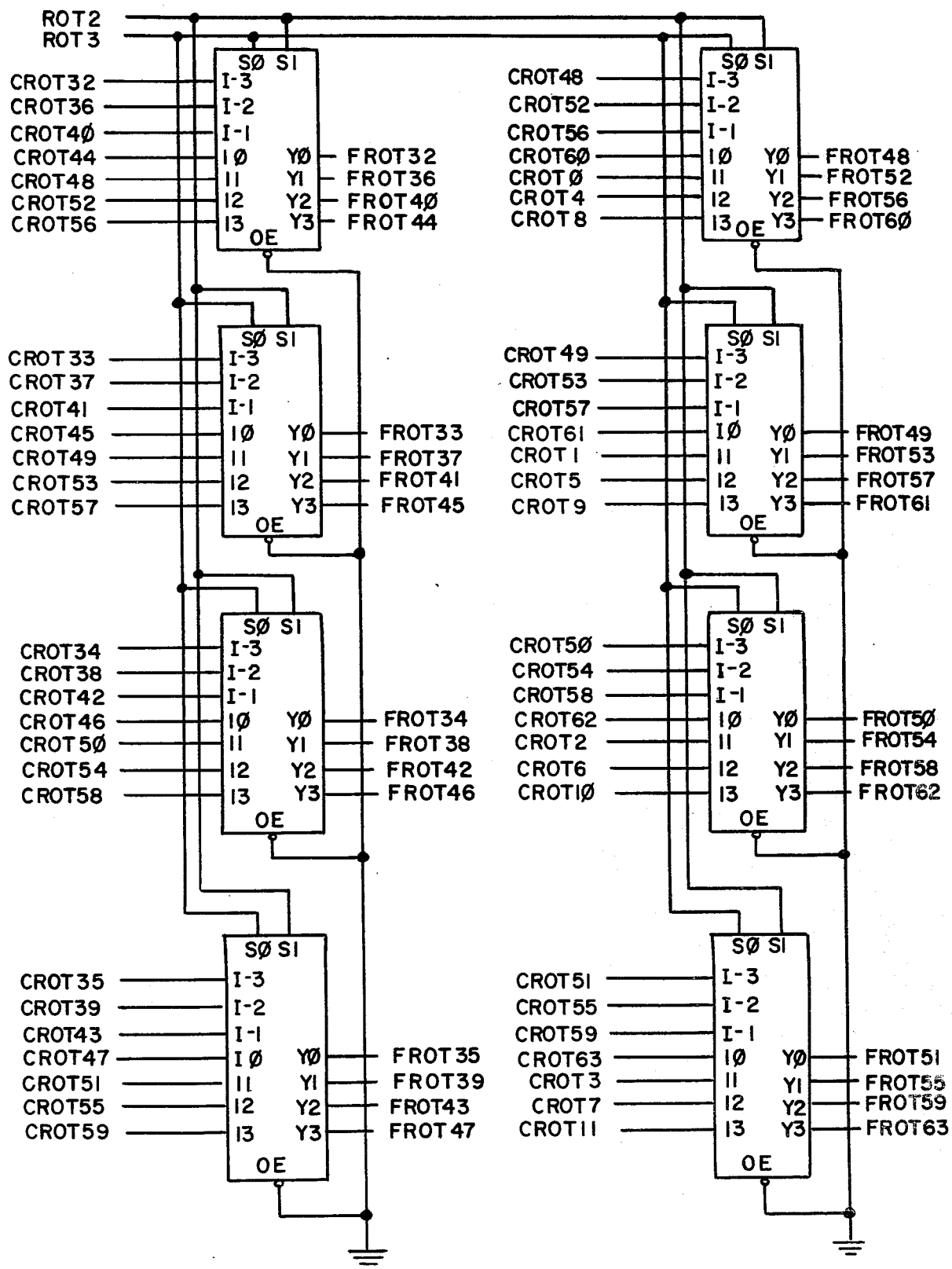
Figure 29:
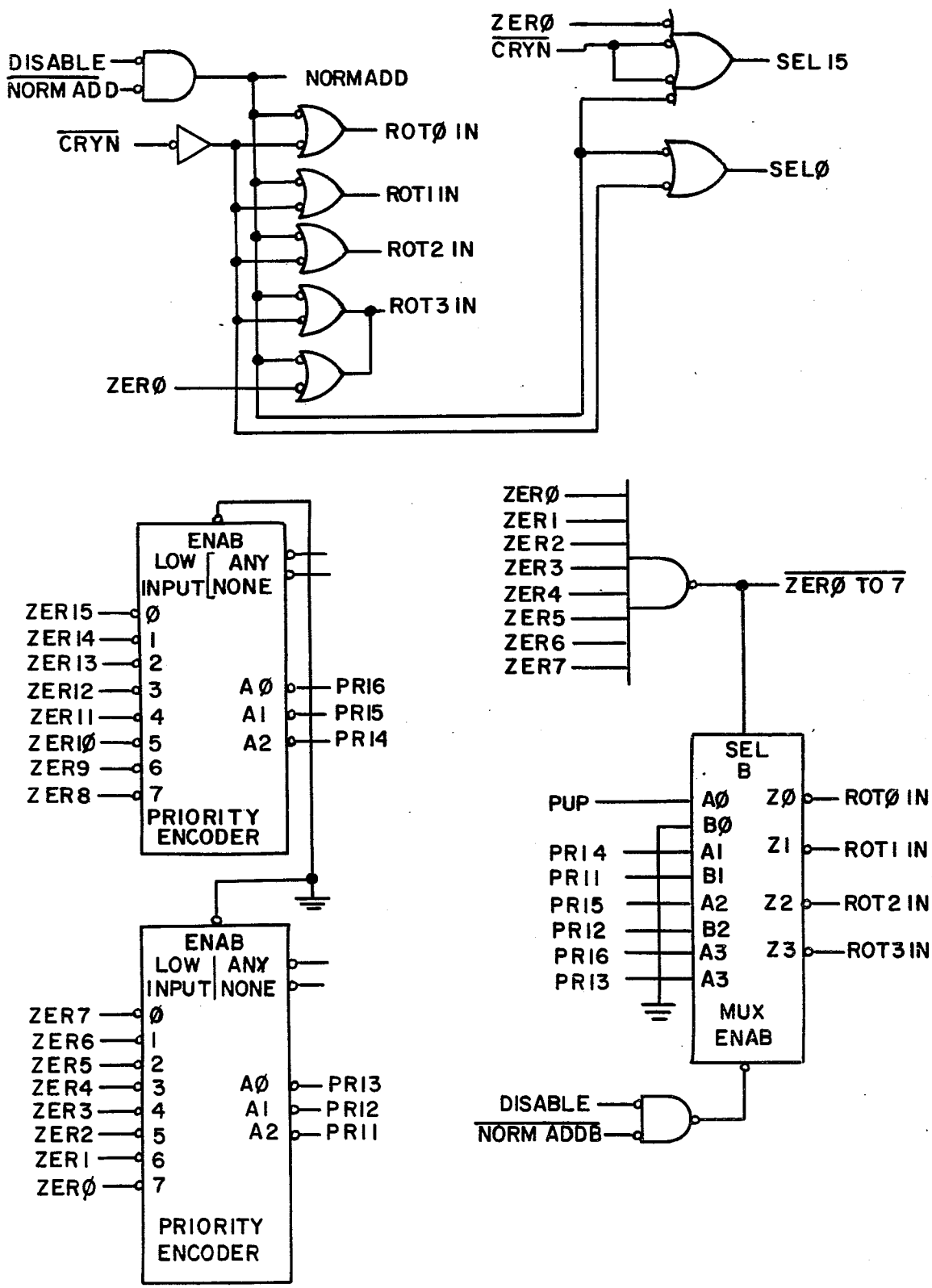
Figure 30:
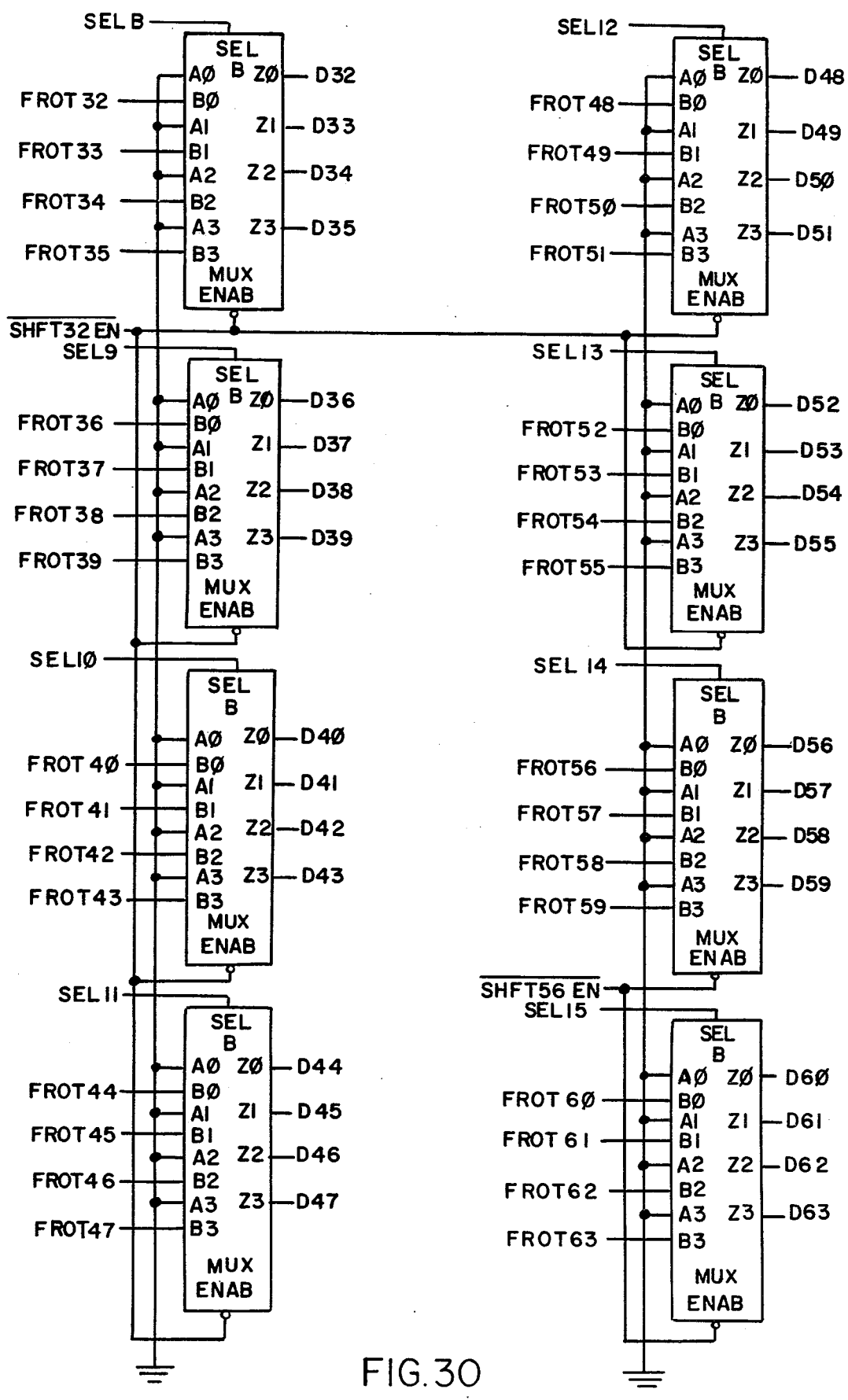
Figure 31:
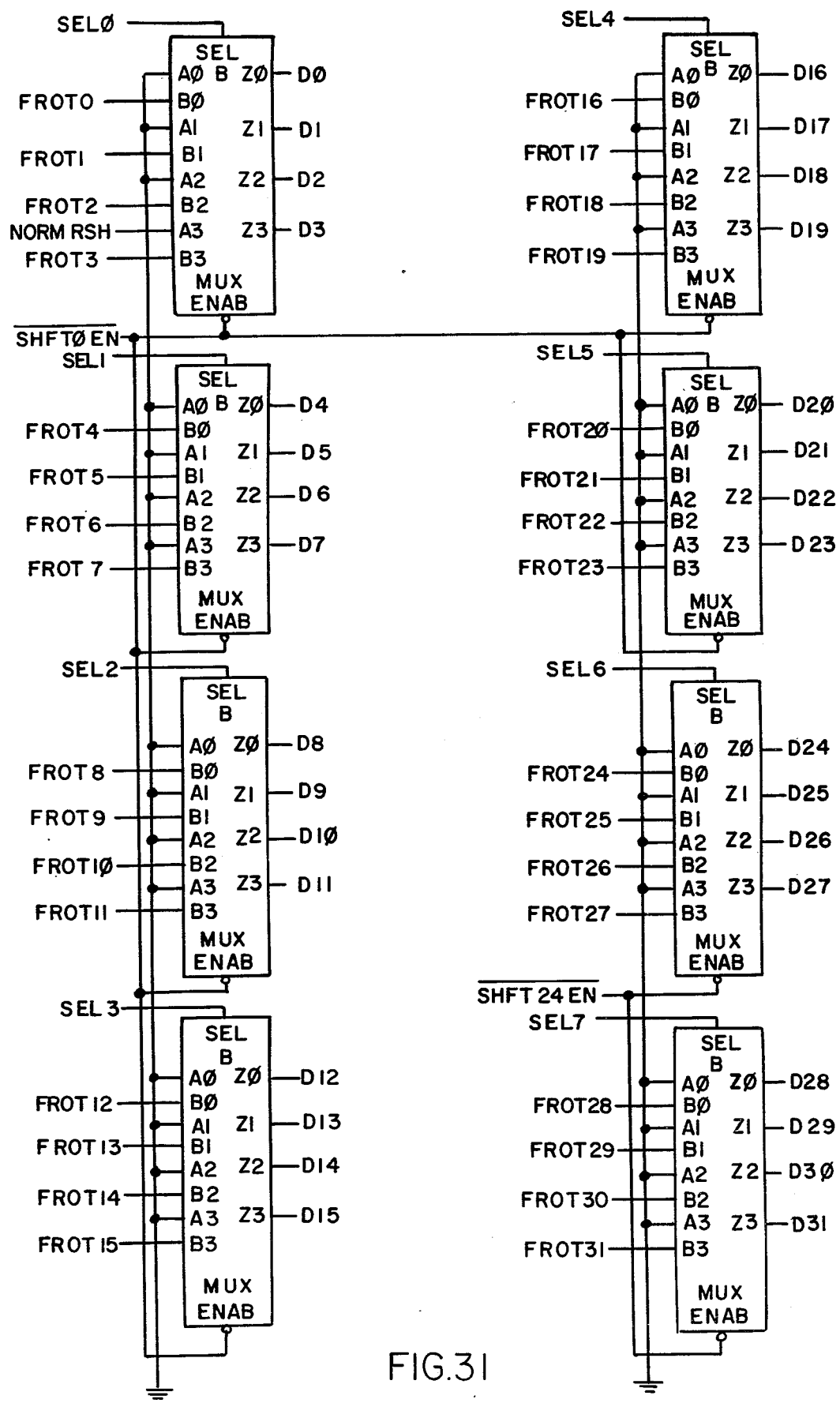
Figure 30:
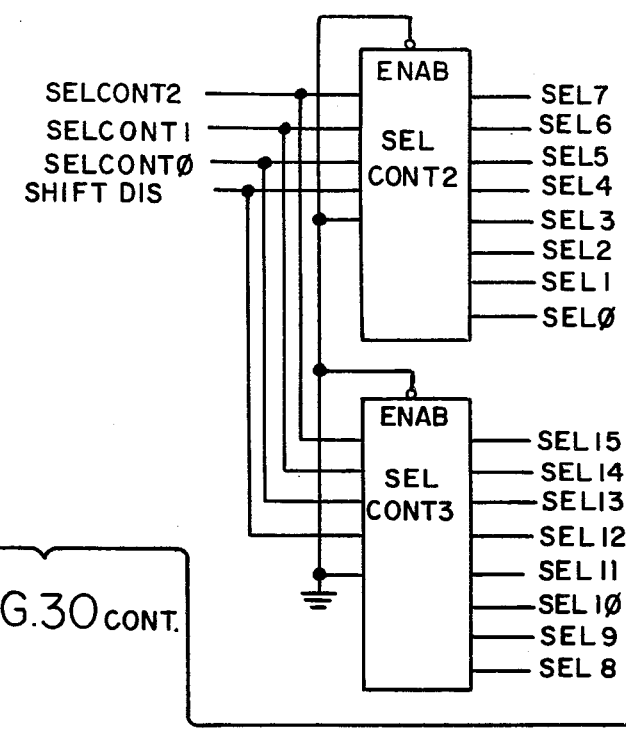
Figure 31:
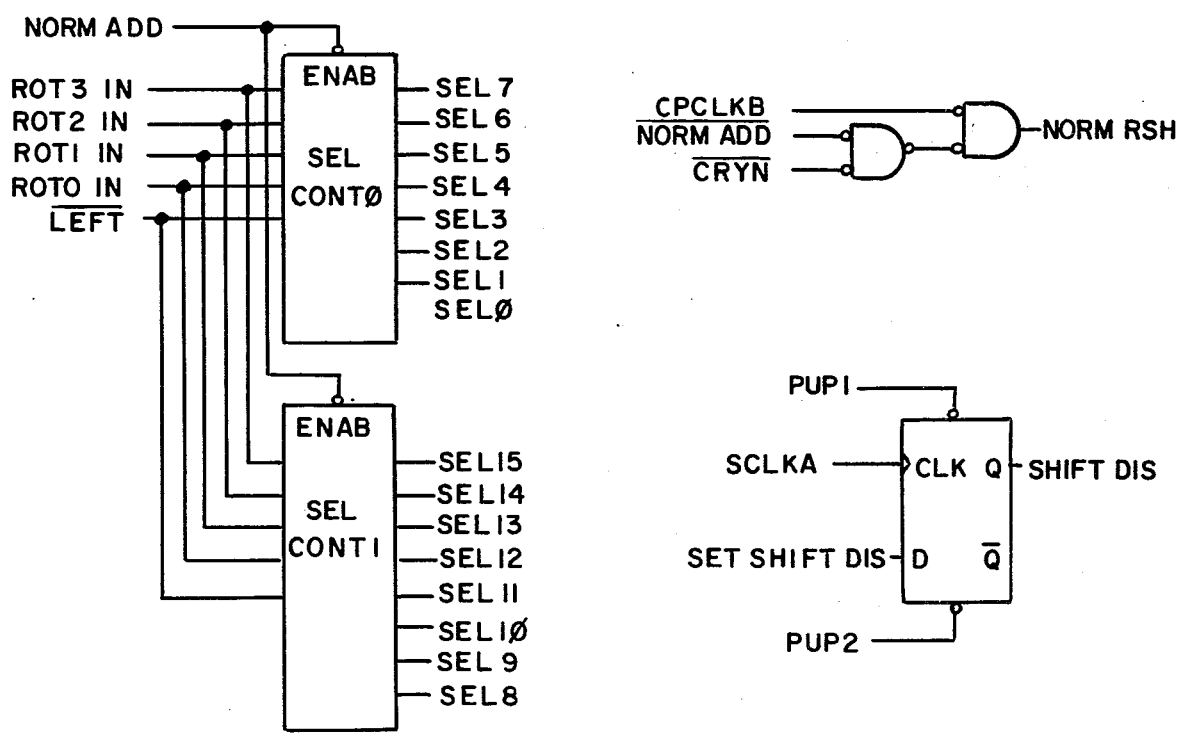
Figure 32:
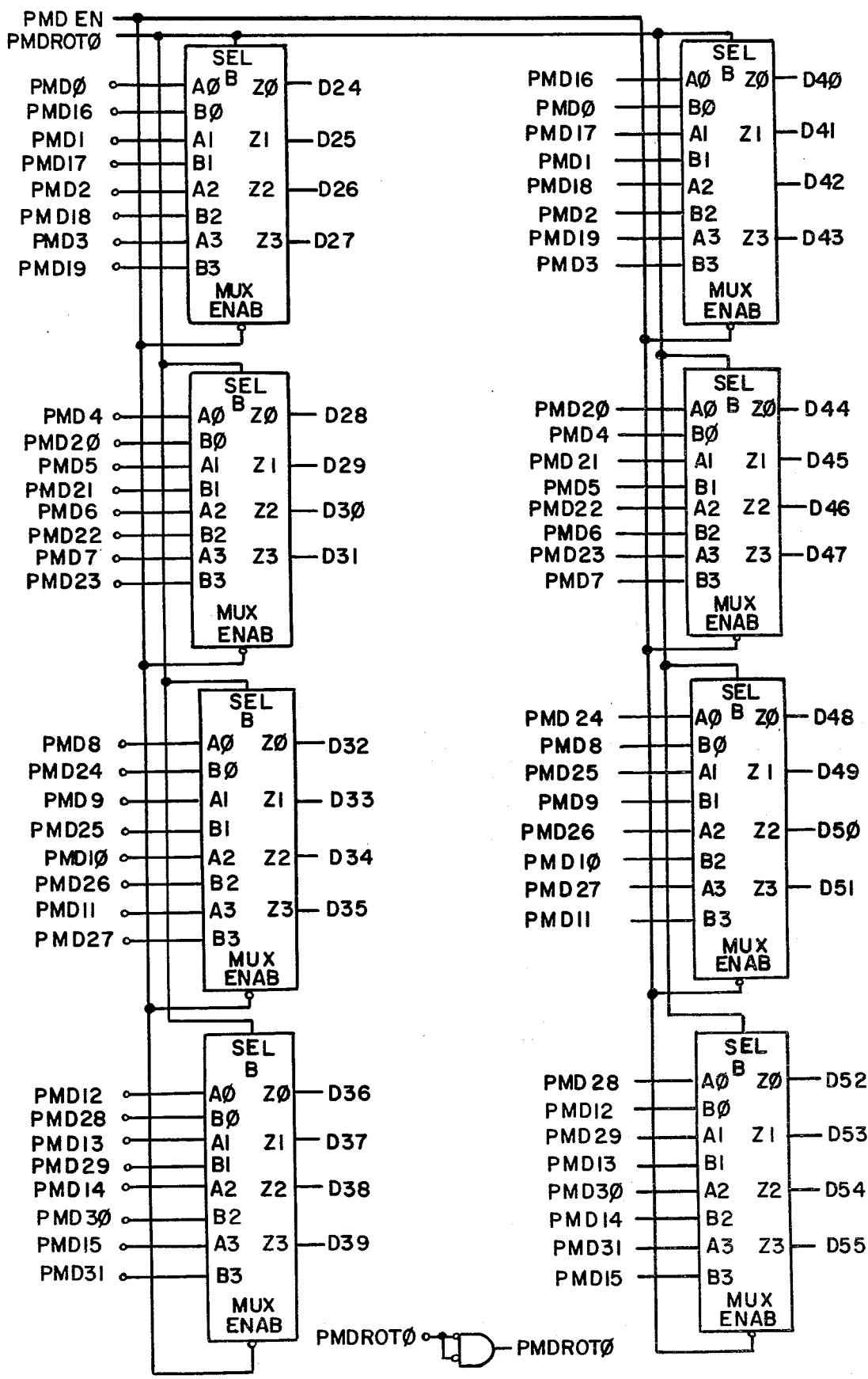
Figure 33A:
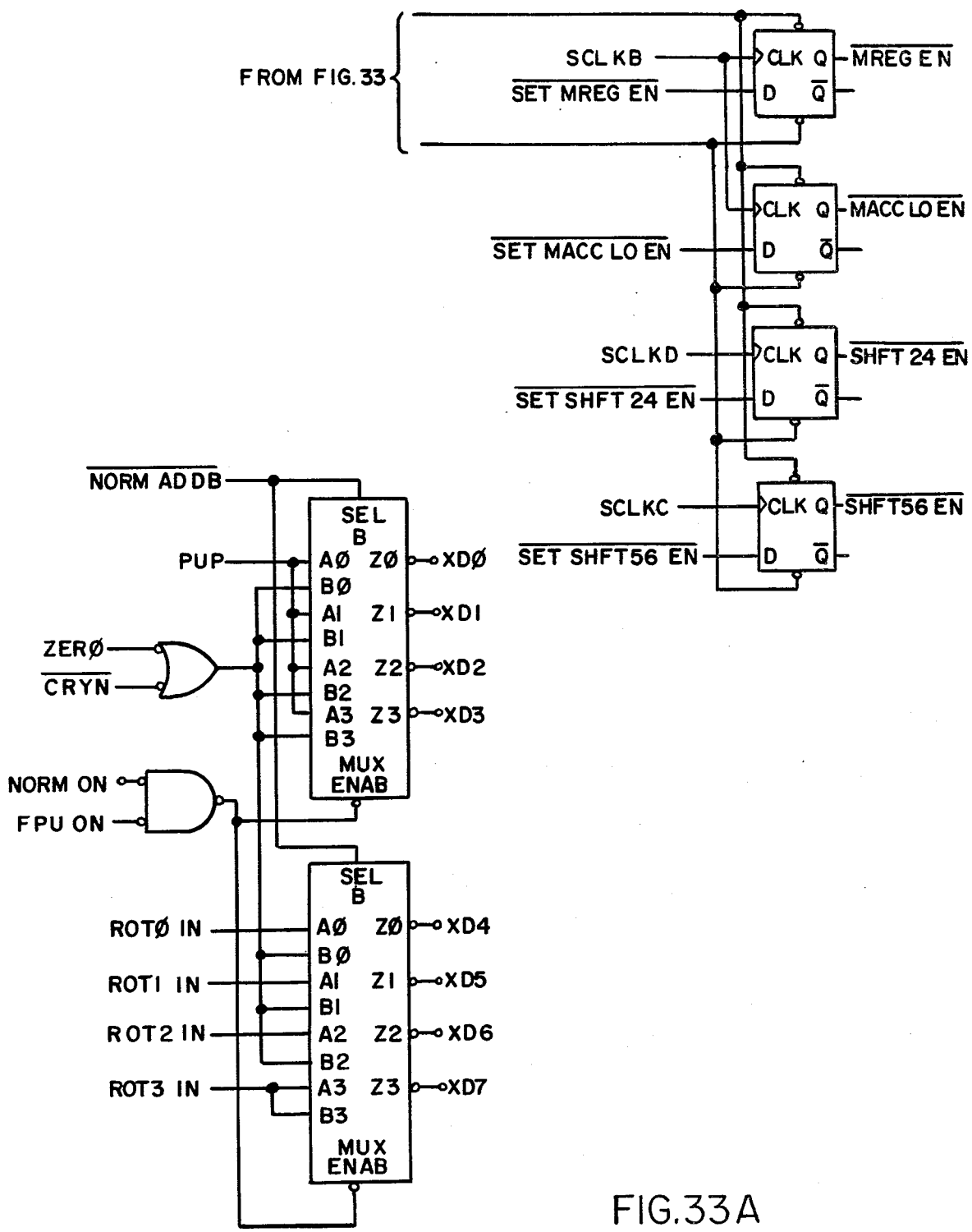
Figure 34:
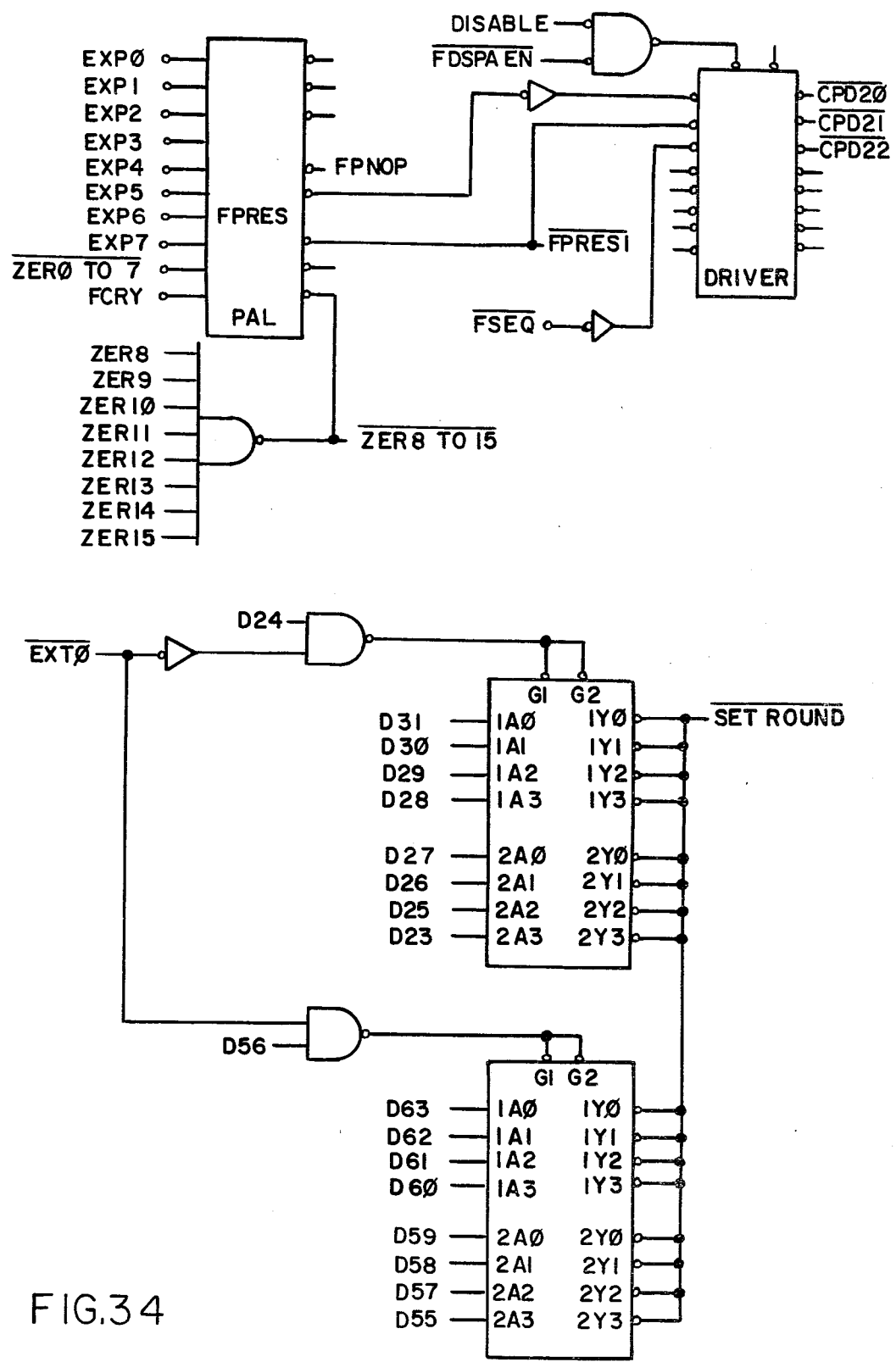
Figure 35:
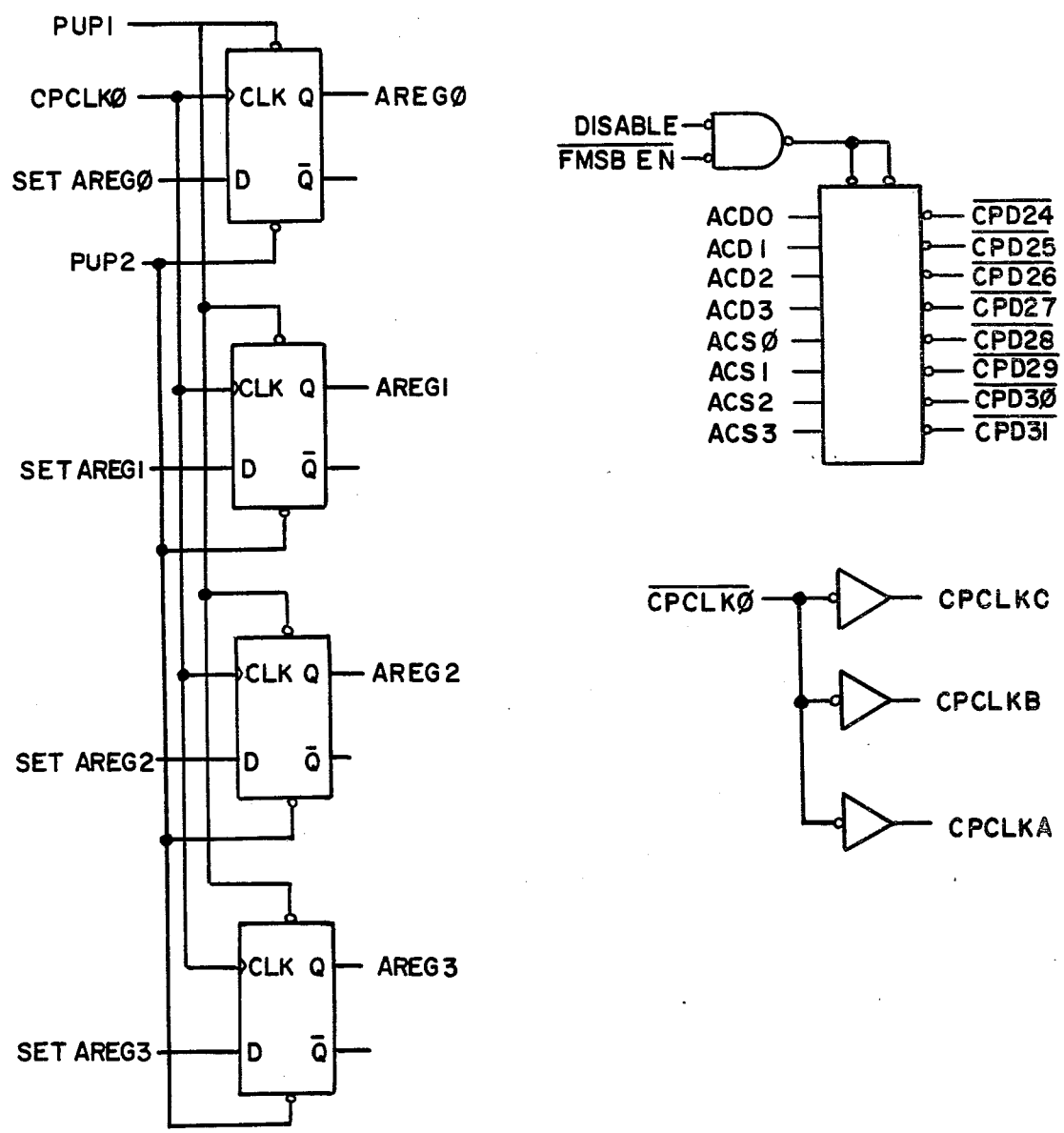
Figure 35A:
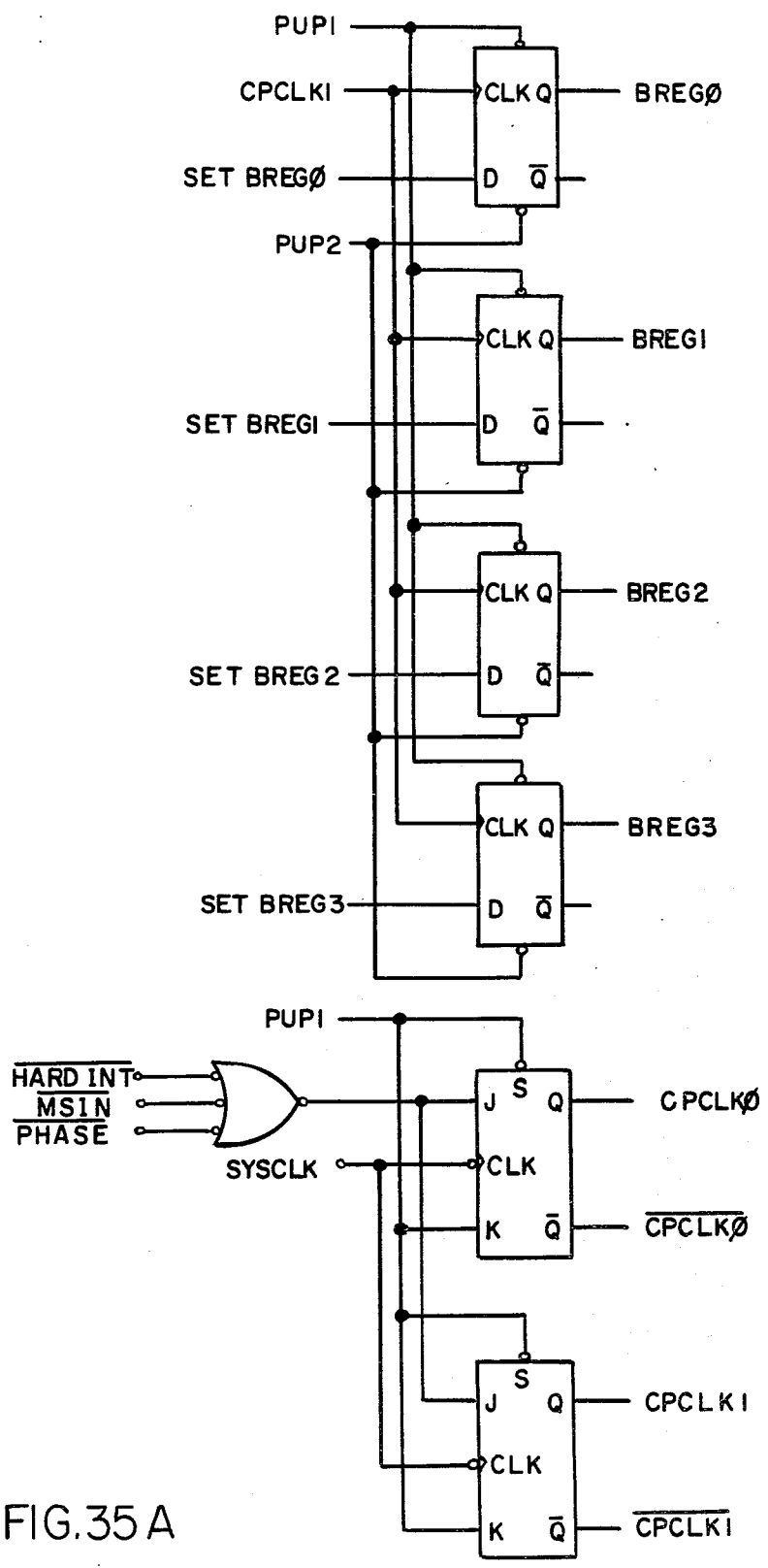
Figure 36:
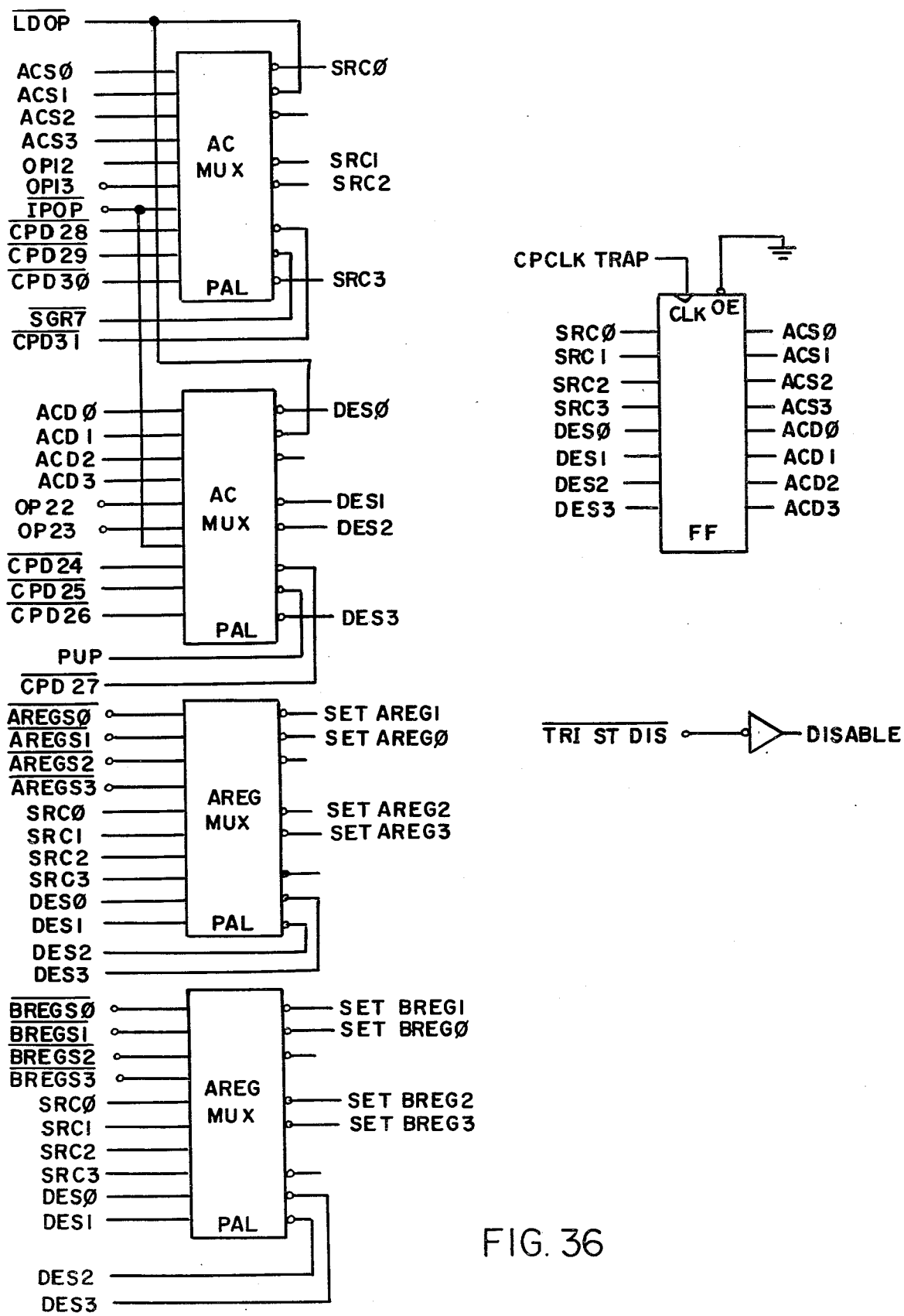
Figure 36A:
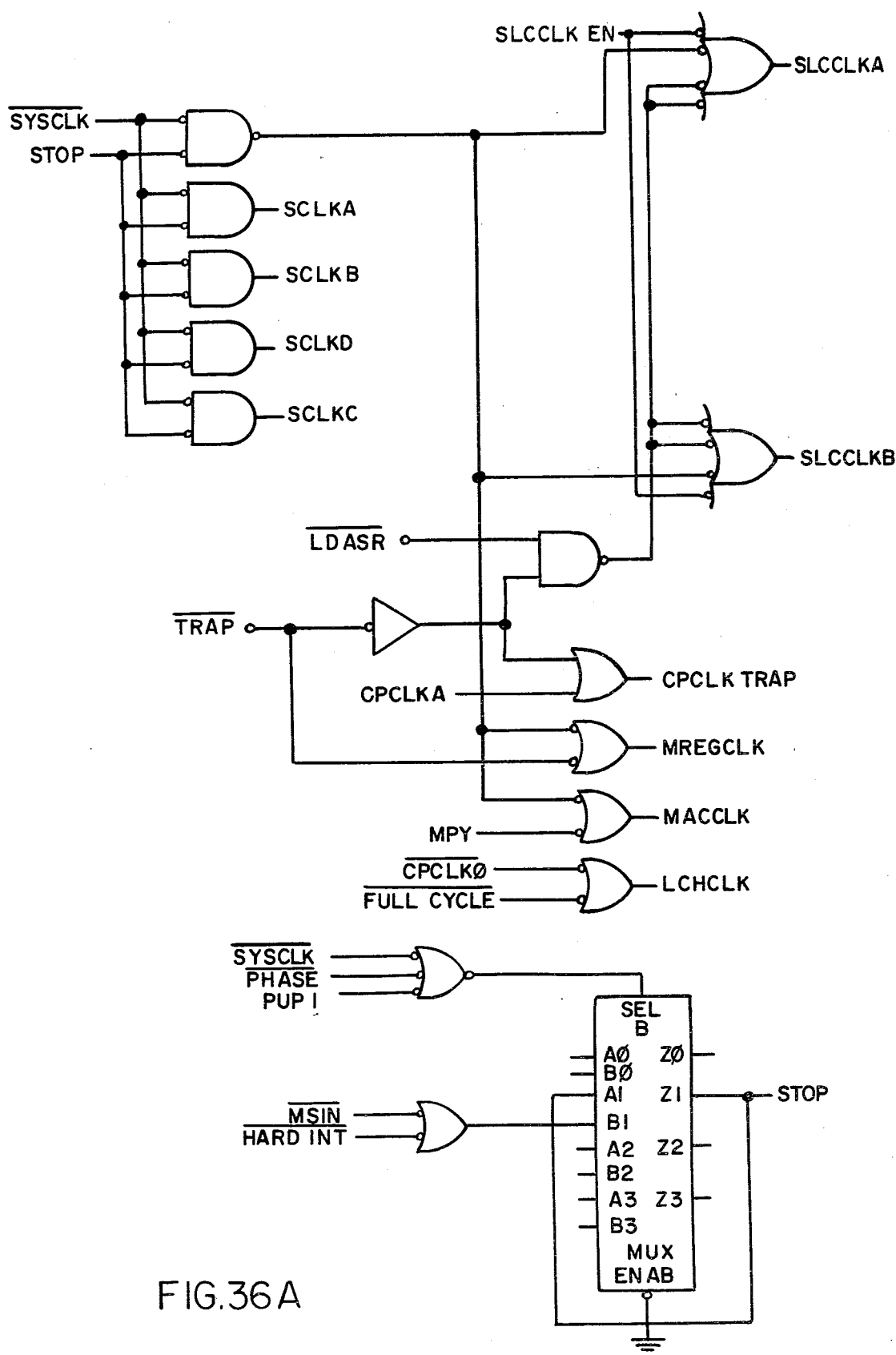

Specific logic which is used to implement the floating point unit board of FIG. 2 is shown in FIGS. 5–36. Thus, the 4-bit microprocessor slice logic is depicted in FIGS. 5–12. FIGS. 13–16 show the 4-bit slice control logic and the control store mode (CSM) and extension (EXT) decode logic. FIGS. 17–18 show various logic such as the look-ahead carry logic, floating point status register logic, test logic, random field logic and the central processor data (CPD) bus control logic. FIGS. 19–20 depict logic associated with the operation of the multiply register (MREG) and multiply accumulator (MACC) of FIG. 2. FIGS. 21–23 show logic associated with the T-latch unit and the CPD bus interface logic depicted in FIG. 2. FIGS. 24–26 show logic associated with the coarse nibble rotator, the Z-latch logic and the shift enable logic of FIG. 2. FIGS. 27–29 show logic associated with the fine nibble rotator of FIG. 2 and further shift control logic. The nibble shift multiplexer units and the processor memory data bus interface logic are shown in FIGS. 30–32. D-bus enable logic, dispatch logic, normalization logic and the round logic for generating the round bit $\overline{\text{SET ROUND}}$ are depicted in FIGS. 33–34. The ACSR (source register), ACDR (destination register), A-register and B-register logic of FIG. 2 are shown in FIGS. 35–36, as well as various clock logic required for FPU operation. The use by those in the art of such specific logic as depicted in FIGS. 5–36, together with the foregoing description, will permit one in the art to practice the invention and to fabricate an FPU board thereof in accordance with the invention, as set forth above.

What is claimed is:

1. In a data processing system having a floating point computation unit for providing floating point computation operations, said floating point unit including
    mantissa processing means for providing an overall computation result comprising a first plurality of bits representing a desired floating point mantissa computation result and a second plurality of bits not supplied as part of said desired floating point mantissa computation result;
    means for providing a carry-in bit to be added to said floating point mantissa computation result;
    means for adding said carry-in bit to the least significant bit of said overall computation result and for causing said carry-in bit to be effectively propagated through said mantissa processing means so as to be added to the least significant bit of said first plurality of bits to form said floating point mantissa computation result.

2. In a data processing system in accordance with claim 1 wherein said mantissa processing means responds to floating point operands and comprises a plurality of multiple-bit slice processor units each processing selected bit slices of said floating point operands to provide said overall computation result, said overall computation result being formed of a plurality of bit slices each effectively provided with a carry-in bit from an adjacent lower significant bit slice processor unit and effectively supplying a carry-out bit to an adjacent higher significant bit slice processor unit, the carry-in bit added to the least significant bit of said overall result being effectively propagated through the plurality of bit slice processors which form said second plurality of bits so as to be added to the bit slice which forms the least significant bit slice of said first plurality of bits.

3. In a data processing system in accordance with claim 2 wherein said processing means has an operating characteristic such that when a bit slice processor unit thereof is placed in an AND operating condition and a selected bit slice of at least one of the floating point operands supplied to the bit slice processor unit is set to zero, the carry-in bit is effectively propagated through said bit slice processor unit as the carry-out bit thereof.

4. In a data processing system in accordance with claim 3 wherein each of the bit slice processor units which form said second plurality of bits is placed in an AND operating condition and the selected bit slice of at least one of the floating operands supplied to said bit slice processor units is set to zero, whereby said carry-in bit is effectively propagated through each said bit slice thereof, said carry-in bit being added to the least significant bit of said first plurality of bits to form said floating point computation result.

5. In a data processing system in accordance with claims 1, 2, 3 or 4 wherein the floating point mantissa computation result is an unrounded result and said carry-in bit adding means comprises means for providing a round bit as the carry-in bit which is added to the least significant bit of said overall computation result, said round bit thereby being added to said unrounded result to produce a rounded floating point mantissa computation result.

6. In a data processing system in accordance with claims 1, 2, 3 or 4 wherein said carry-in bit providing means comprises means responsive to a carry-in bit supplied from a source external to said floating point computation unit as the carry-in bit which is added to the least significant bit of said overall computation result, said externally supplied carry-in bit thereby being added to said floating point computation result.

7. In a data processor system in accordance with claims 2, 3 or 4 wherein the selected bit slices processed by each of said bit slice processor units comprise 4 bits of said floating point operands.

8. In a data processing system in accordance with claims 2, 3 or 4 wherein said floating point computation result comprises 64 bits.

9. In a data processing system in accordance with claim 8 wherein said first plurality of bits comprises 24 bits and said second plurality of bits comprises 40 bits.

10. In a data processing system in accordance with claim 8 wherein said first plurality of bits comprises 56 bits and said second plurality of bits comprises 8 bits.

11. In a data processing system in accordance with claim 3 wherein each bit slice processor unit is capable of asserting a propagate bit or a generate bit and the means for adding said carry-in bit and for causing said carry-in bit to be effectively propagated through said bit slice processor unit includes a plurality of look-ahead logic means responsive to said bit slice processor units whereby, when a bit slice processor unit asserts its propagate bit but does not assert its generate bit, the look-ahead logic means associated therewith propagates its carry-in bit but does not generate a carry-out bit.

* * * * *